(12) United States Patent   (10) Patent No.: US 8,589,260 B2
Chambers et al.   (45) Date of Patent: Nov. 19, 2013

(54) SYSTEM AND METHOD FOR MONITORING SECURITIES HOLDINGS FOR RELATED ENTITIES

(75) Inventors: John Chambers, Toronto (CA);
Michael Searle, Toronto (CA)

(73) Assignee: Royal Bank of Canada, Montreal (CA)

( * ) Notice: Subject to any disclaimer, the term of this patent is extended or adjusted under 35 U.S.C. 154(b) by 318 days.

(21) Appl. No.: 12/791,191

(22) Filed: Jun. 1, 2010

(65) Prior Publication Data

US 2011/0078059 A1   Mar. 31, 2011

Related U.S. Application Data

(60) Provisional application No. 61/247,400, filed on Sep. 30, 2009.

(51) Int. Cl.
*G07B 17/00* (2006.01)
*G07F 19/00* (2006.01)

(52) U.S. Cl.
USPC .......................................................... 705/30

(58) Field of Classification Search
USPC .......................................................... 705/36
See application file for complete search history.

(56) References Cited

U.S. PATENT DOCUMENTS

| | | | |
|---|---|---|---|
| 4,334,270 A | 6/1982 | Towers |
| 5,101,353 A | 3/1992 | Lupien |
| 5,806,048 A | 9/1998 | Kiron |
| 5,819,238 A | 10/1998 | Fernholz |
| 5,864,871 A | 1/1999 | Kitain |
| 5,875,437 A | 2/1999 | Atkins |
| 6,018,721 A | 1/2000 | Aziz |
| 6,078,924 A | 6/2000 | Ainsbury |
| 6,236,980 B1 | 5/2001 | Reese |
| 6,347,307 B1 | 2/2002 | Sandhu |
| 6,513,019 B2 | 1/2003 | Lewis |
| 6,654,788 B1 | 11/2003 | Chance |
| 6,681,211 B1 | 1/2004 | Gatto |
| 6,802,042 B2 | 10/2004 | Rangan |
| 6,965,886 B2 | 11/2005 | Govrin |
| 7,013,310 B2 | 3/2006 | Dheer |
| 7,039,608 B2 | 5/2006 | Johnson |
| 7,044,375 B2 | 5/2006 | Scott |
| 7,103,556 B2 | 9/2006 | Del Rey |
| 7,107,285 B2 | 9/2006 | Von Kaenel |
| 7,146,333 B2 | 12/2006 | Hamer |
| 7,165,044 B1 | 1/2007 | Chaffee |
| 7,178,096 B2 | 2/2007 | Rangan |
| 7,246,092 B1 | 7/2007 | Peterson |
| 7,249,075 B1 | 7/2007 | Altomare |
| 7,251,629 B1 | 7/2007 | Marynowski |

(Continued)

FOREIGN PATENT DOCUMENTS

| | | |
|---|---|---|
| CA | 2202157 | 4/1996 |
| CA | 2294999 | 12/1998 |

(Continued)

*Primary Examiner* — Seye Iwarere
(74) *Attorney, Agent, or Firm* — Norton Rose Fulbright Canada LLP; Matthew J. Marquardt

(57) ABSTRACT

Systems, methods, and computer-executable instruction mechanisms such as programming structures for generating signals representing holdings of securities held by pluralities of commonly-controlled entities. Such systems, methods, and computer-executable instruction mechanisms can further be useful for generating signals representing alerts and data useful in generating reports relating to securities holdings, and for assessing regulatory consequences of proposed transactions.

20 Claims, 19 Drawing Sheets

(56) References Cited

U.S. PATENT DOCUMENTS

| | | | |
|---|---|---|---|
| 7,310,615 B2 | 12/2007 | Lewis | |
| 7,536,340 B2 | 5/2009 | Dheer | |
| 7,657,474 B1* | 2/2010 | Dybala et al. | 705/35 |
| 2001/0011222 A1* | 8/2001 | McLauchlin et al. | 705/1 |
| 2002/0019793 A1 | 2/2002 | Frattalone | |
| 2002/0042764 A1 | 4/2002 | Gardner | |
| 2002/0065752 A1 | 5/2002 | Lewis | |
| 2002/0087373 A1 | 7/2002 | Dickstein | |
| 2002/0116620 A1* | 8/2002 | Gimbert et al. | 713/185 |
| 2002/0122078 A1 | 9/2002 | Markowski | |
| 2002/0133463 A1 | 9/2002 | Curtis | |
| 2002/0138386 A1 | 9/2002 | Maggioncalda | |
| 2002/0138408 A1* | 9/2002 | Lawrence | 705/38 |
| 2002/0188556 A1 | 12/2002 | Colica | |
| 2003/0009411 A1 | 1/2003 | Ram | |
| 2003/0065613 A1 | 4/2003 | Smith | |
| 2003/0236735 A1 | 12/2003 | Brennan | |
| 2004/0010458 A1 | 1/2004 | Friedman | |
| 2004/0122756 A1 | 6/2004 | Creeden | |
| 2004/0139031 A1* | 7/2004 | Amaitis et al. | 705/80 |
| 2004/0167849 A1 | 8/2004 | Yass | |
| 2004/0177016 A1 | 9/2004 | Jones et al. | |
| 2004/0267660 A1 | 12/2004 | Greenwood | |
| 2005/0022029 A1 | 1/2005 | Potter | |
| 2005/0049954 A1 | 3/2005 | Graham | |
| 2005/0125316 A1 | 6/2005 | Levering | |
| 2005/0137967 A1 | 6/2005 | Ryan | |
| 2005/0187862 A1 | 8/2005 | Dheer | |
| 2005/0288994 A1 | 12/2005 | Haunschild | |
| 2006/0004653 A1 | 1/2006 | Strongin | |
| 2006/0010048 A1 | 1/2006 | Hartmann | |
| 2006/0036525 A1 | 2/2006 | Ramos | |
| 2006/0184473 A1 | 8/2006 | Eder | |
| 2006/0229963 A1 | 10/2006 | Creager | |
| 2006/0259325 A1 | 11/2006 | Patterson | |
| 2007/0006315 A1 | 1/2007 | Bushnaq | |
| 2007/0043638 A1 | 2/2007 | Tabs | |
| 2007/0043639 A1 | 2/2007 | Tabs | |
| 2007/0055596 A1* | 3/2007 | Yankovich et al. | 705/35 |
| 2007/0129960 A1 | 6/2007 | Farrell | |
| 2007/0130043 A1 | 6/2007 | O'Shaughnessy | |
| 2007/0143198 A1 | 6/2007 | Brandes | |
| 2007/0156658 A1 | 7/2007 | Riley | |
| 2007/0162494 A1 | 7/2007 | Schneider | |
| 2007/0174210 A1* | 7/2007 | Zajkowski et al. | 705/36 R |
| 2007/0208653 A1* | 9/2007 | Murphy | 705/37 |
| 2007/0294157 A1 | 12/2007 | Singla | |
| 2008/0005002 A1 | 1/2008 | Ferris | |
| 2008/0140688 A1 | 6/2008 | Clayton | |
| 2008/0162375 A1 | 7/2008 | Seely | |
| 2008/0162377 A1 | 7/2008 | Pinkas | |
| 2010/0268631 A1* | 10/2010 | Feldman et al. | 705/37 |

FOREIGN PATENT DOCUMENTS

| | | |
|---|---|---|
| CA | 2320291 | 8/1999 |
| CA | 2366548 | 10/2000 |
| CA | 2369296 | 10/2000 |
| CA | 2368612 | 11/2000 |
| CA | 2403246 | 3/2001 |
| CA | 2404880 | 3/2001 |
| CA | 2390080 | 5/2001 |
| CA | 2403095 | 9/2001 |
| CA | 2415449 | 2/2002 |
| CA | 2431335 | 6/2002 |
| CA | 2441211 | 9/2002 |
| CA | 2441238 | 9/2002 |
| CA | 2456827 | 2/2003 |
| CA | 2394268 | 8/2003 |
| CA | 2428668 | 11/2003 |
| CA | 2433091 | 12/2003 |
| CA | 2492842 | 1/2004 |
| CA | 2513896 | 8/2004 |
| CA | 2521436 | 1/2005 |
| CA | 2441516 | 3/2005 |
| CA | 2578655 | 11/2005 |
| CA | 2612198 | 12/2006 |
| WO | 0065510 | 11/2000 |
| WO | 0131481 A2 | 5/2001 |
| WO | 03029931 A2 | 4/2003 |
| WO | 03029931 A3 | 10/2003 |
| WO | 2008115989 A2 | 9/2008 |

\* cited by examiner

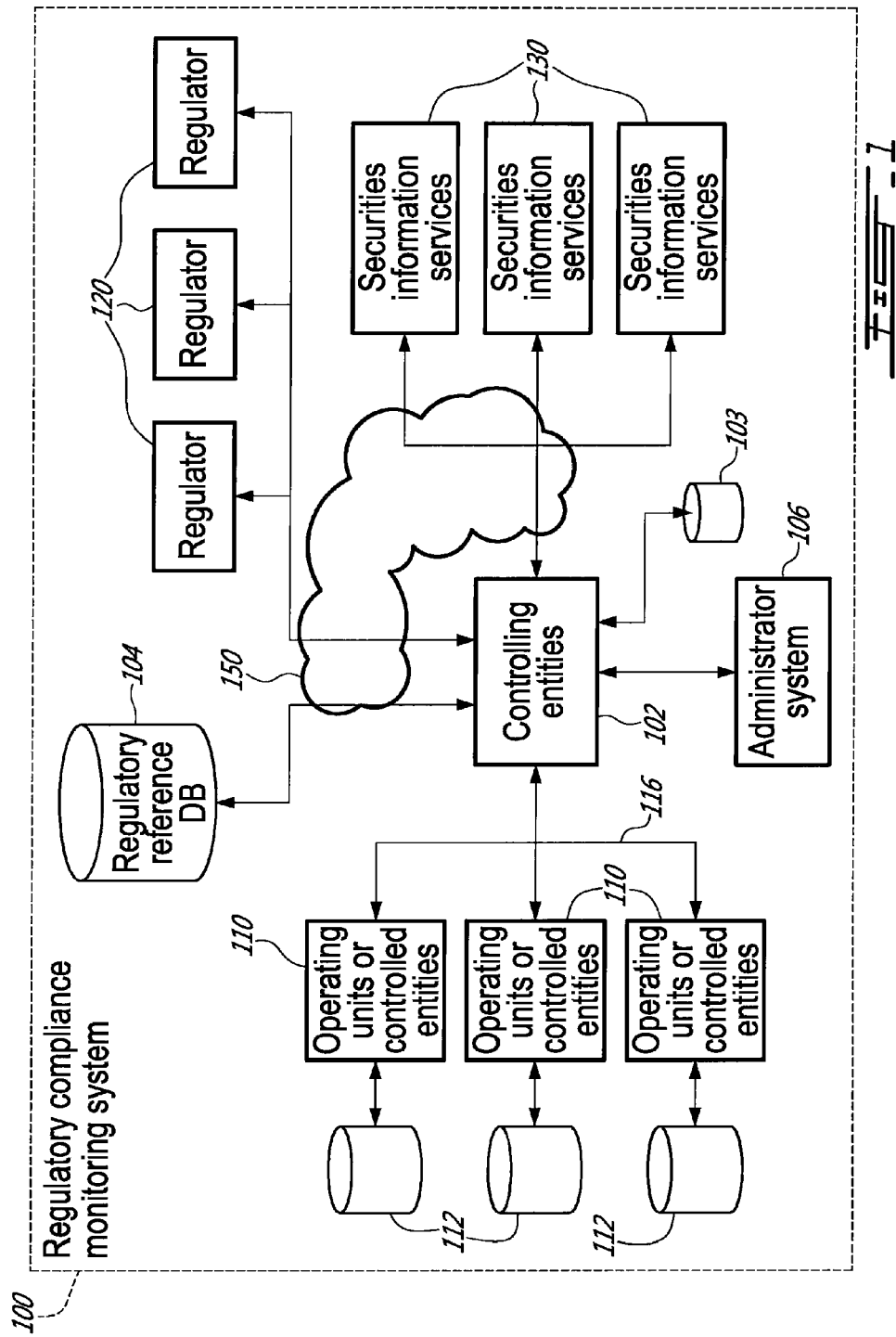

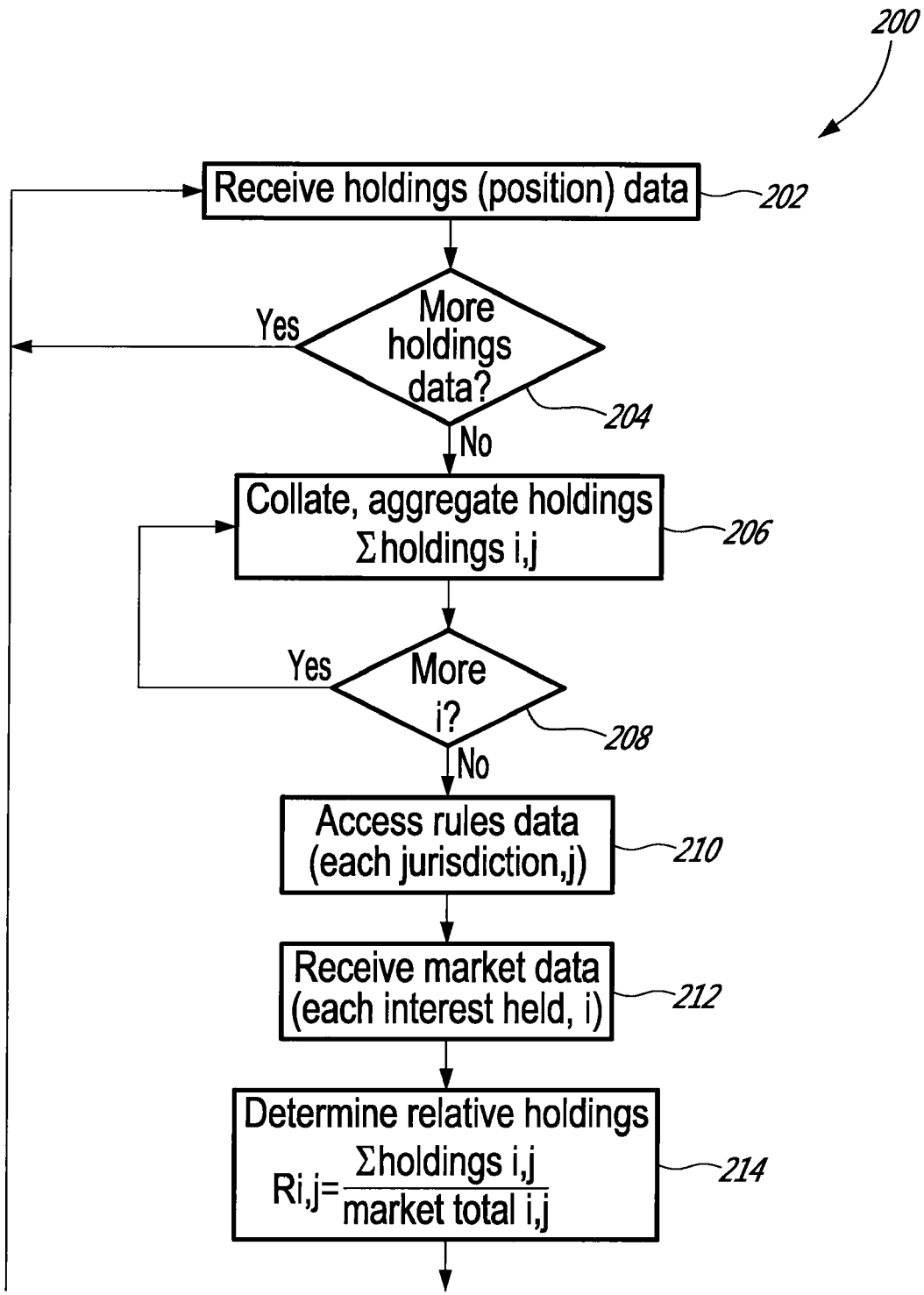

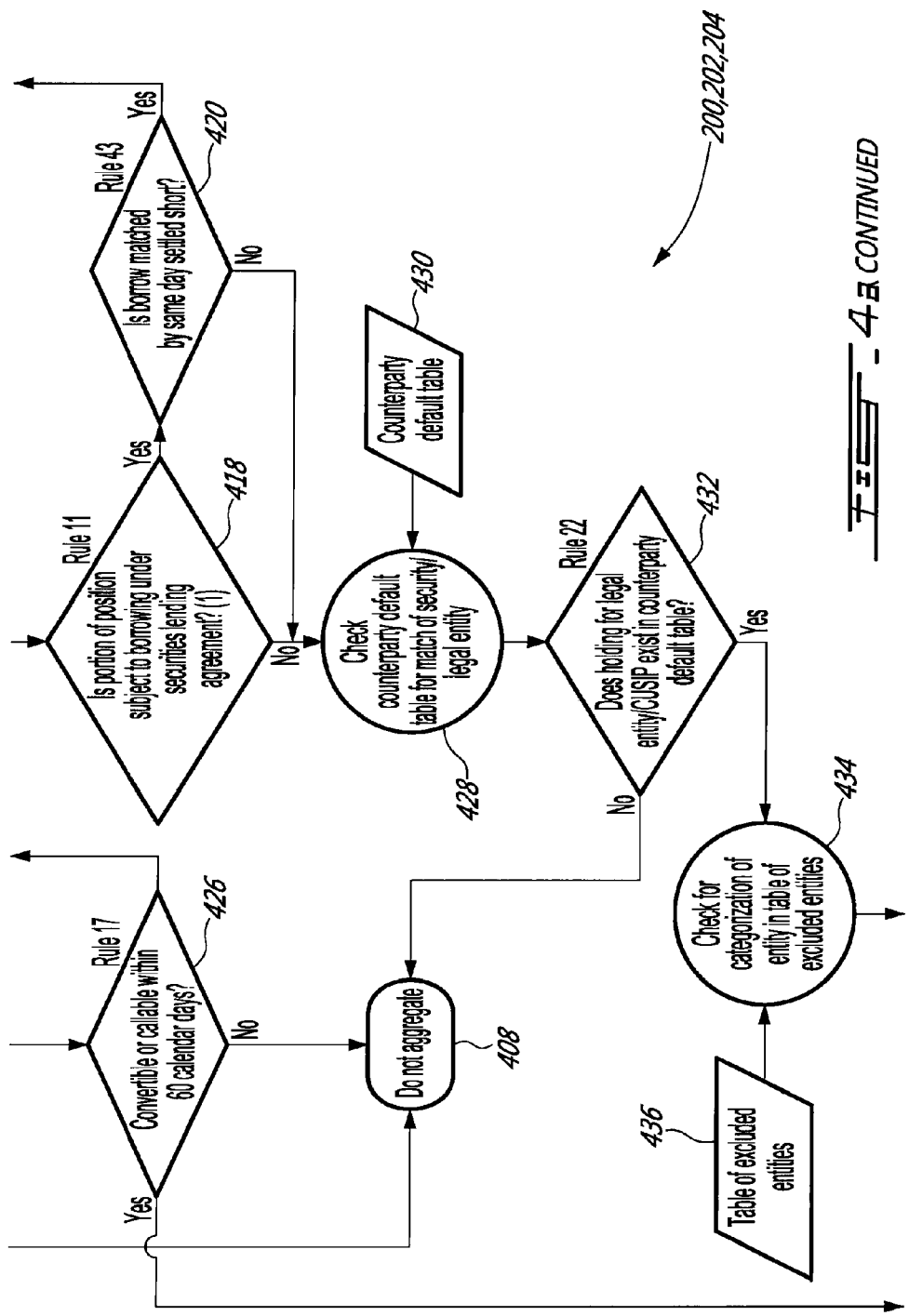

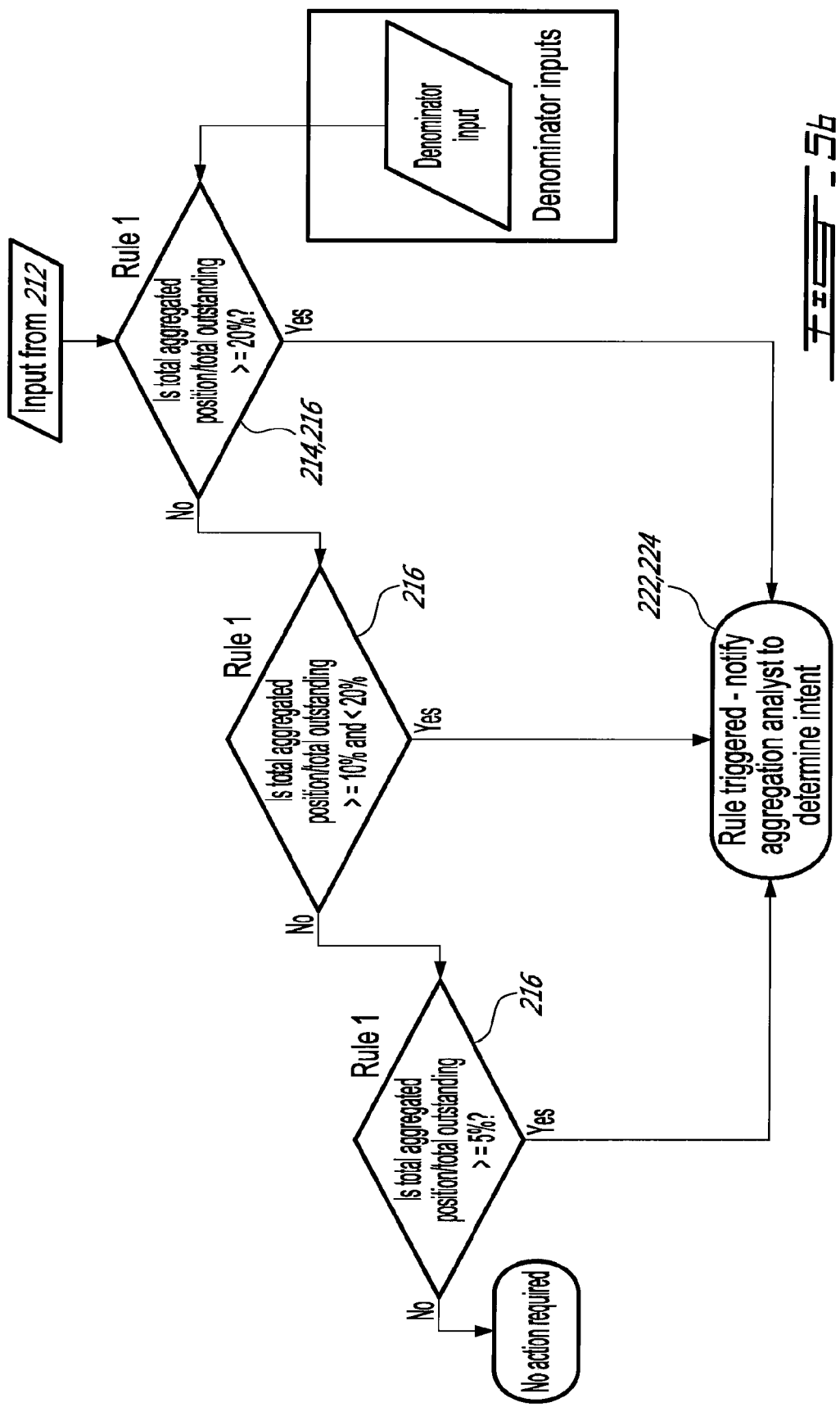

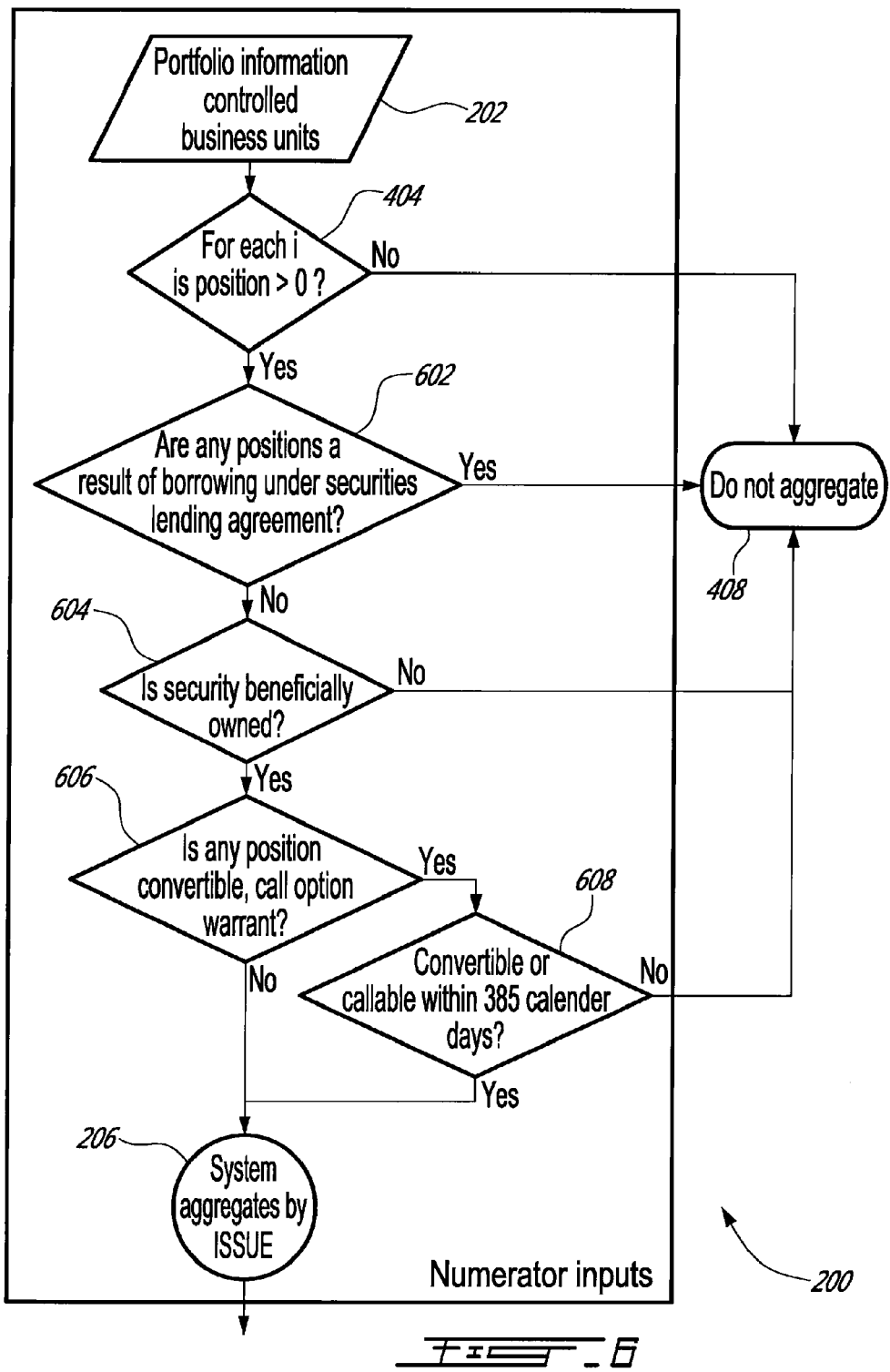

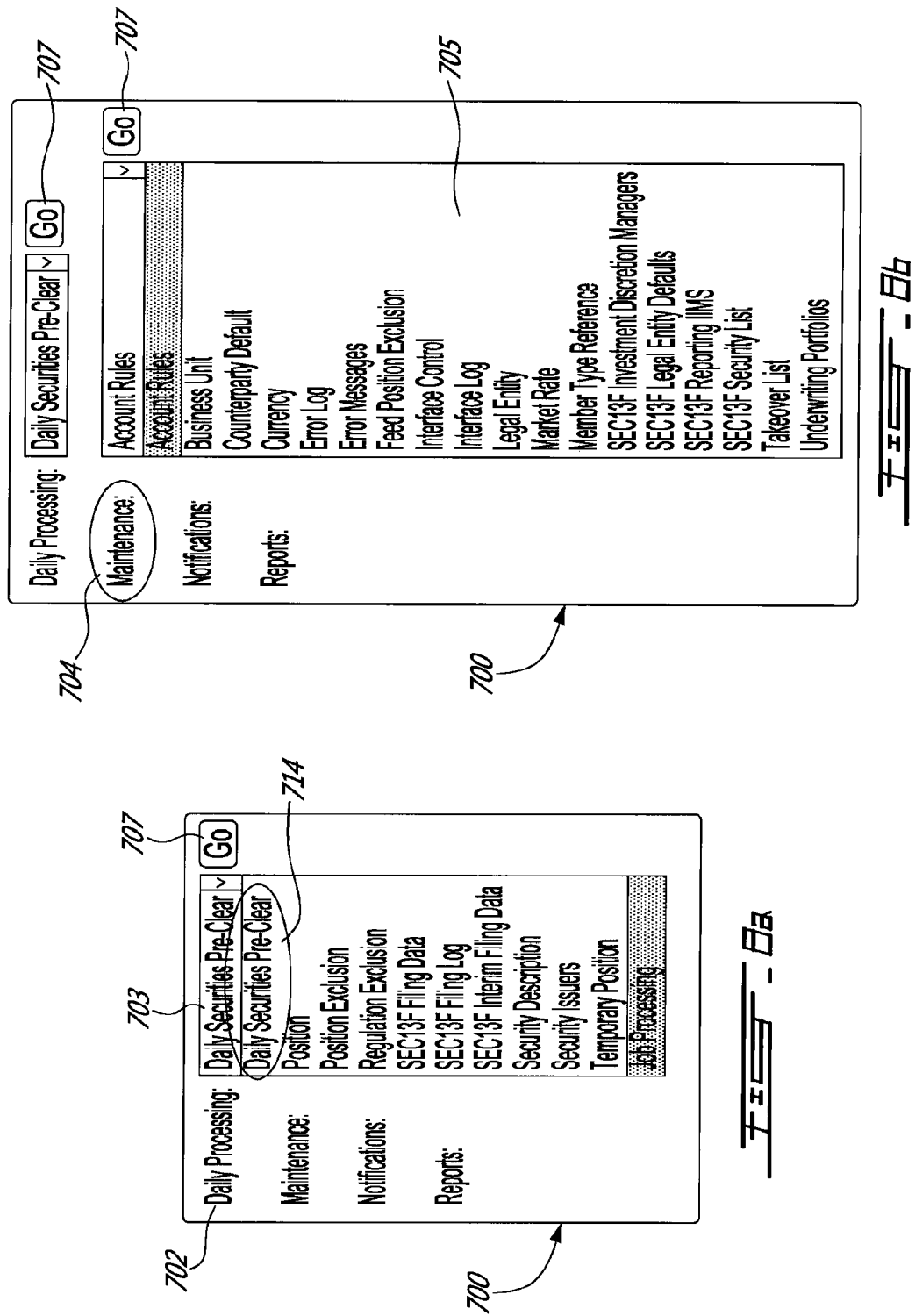

Notification - Search

*914*

- 902 — Notification Type: [Security ▼] ← Breach Type: [Breach ▼]
- 906 — Regulation Code: [Div Stop Loss Rule ▼]
- 908 — Security Identifier Type: [ ▼]  Security Identifier: [   ]
- 910 — Issuer Identifier Type: [ ▼]  Issuer Identifier: [   ]
- 912 — From Date: [05] [07] [2007]  To Date: [12] [31] [2099]
           (mm) (dd) (yyyy)          (mm) (dd) (yyyy)

select appropriate choices for search to increase granularity

—916
—918

[Clear] [Extract] [Search] — 904

Notification - View

| | | | |
|---|---|---|---|
| Breach Date: | 05/09/2007 | Breach Type: | Breach |
| Notification Type: | SECURITY | Regulation Code: | DIVSL |
| Breach Message: | Dividend Stop Loss Breach | | |
| Issuer Name: | ADVANCED DEPOSITION TECHNOLOGIES INC | Issuer Identifier: | 007521 |
| Issuer Identifier Type: | CUSIP | | |
| Security Name: | ADVANCED DEPOSITION TECHNOLOGIES INC COMMON STOCK | RBC DS IC: | 1634761 |
| Security Identifier Type: | Cusip | Security Identifier: | 007521107 |
| Outstanding Shares: | 5000000 | Position Quantity: | 4019310000 |
| Percentage Owned: | 8.01 | Trigger Percentage: | 6.00 |

1000
1002
1006
1004
1008

[Back] [Extract]

FIG. 10

Pre-Clears Request Initiation

- 908 — Security Identifier Type:
- 1102 — Stock Exchange:
- 1104 — Ownership Category:
- 1106 — Expiry Date: 03 23 2007 (mm) (dd) (yyyy)
- 916 — Security Identifier:
- 1100
- 1108 — Input Shares Quantity:

Comment: EXTER TEXT HERE

[Back] [Clear] [Submit] — 1110
— 1112

_FIG. 11a_

Pre-Clears - View

| Request Details | | | |
|---|---|---|---|
| Run Date: | 06/18/2001 | Expiry Date: | 07/02/2001 |
| Comment: | 50000 SHARES FOR VINCENT INVESTOR | | |
| Security Information | | | |
| Security Name: | ACME FINANCIAL INC. SLECN 3.2 | RBC DS ID: | 155595 |
| Security Identifier Type: | Cusip | Security Identifier: | 666796999 |
| Stock Excahnge: | | Outstanding Shares: | 13,008,000 |
| Proposed Acquisition Quantity: | 50,000 | | |
| Holding Summary | | | |
| Total Position Currently: | 163,500 | Percent Currently Owned: | 1.26% |
| Post Acquisition Quantity: | 213,500 | Post Acquisition Percent: | 1.6400% |

1200, 1202, 1204, 1206, 1208

[Back] [Extract]

_FIG. 11b_

SYSTEM AND METHOD FOR MONITORING SECURITIES HOLDINGS FOR RELATED ENTITIES

CROSS REFERENCE TO RELATED APPLICATION AND PRIORITY CLAIM

This application claims the benefit of U.S. provisional patent application 61/247,400, filed 30 Sep. 2009 and entitled "SYSTEM AND METHOD FOR MONITORING SECURITIES COMPLIANCE FOR RELATED ENTITIES." The entire contents of that application, including any appendices attached thereto, are hereby incorporated by reference. This application further claims priority from Canadian patent application 2,681,251, filed 30 Sep. 2009 and entitled "SYSTEM AND METHOD FOR MONITORING SECURITIES COMPLIANCE FOR RELATED ENTITIES.

COPYRIGHT AND LEGAL NOTICE

This application contains material relating to the holding, transfer, and/or administration of portfolios of securities and other financial interests. Aspects of such holding, transfer, and/or administration may be subject to regulation by governmental and other agencies. The disclosure herein is made solely in terms of logical, data processing, administrative, and economic possibility, without regard to specific statutory, regulatory, or other legal considerations. Nothing herein is intended as a statement or representation that any system, method or process proposed or discussed herein, or the use thereof, does or does not comply with any statute, law, regulation, or other legal requirement in any jurisdiction; nor should it be taken or construed as doing so.

A portion of the disclosure of this patent document may contain material which is subject to copyright protection. The copyright owner has no objection to the facsimile reproduction by anyone of the patent document or the patent disclosure, as it appears in the Patent and Trademark Office patent files or records following publication, but otherwise reserves all copyrights whatsoever.

BACKGROUND

Banks, brokerage houses, and other financial institutions which hold large numbers and amounts of various equity and fixed income securities are frequently subject to reporting requirements imposed by multiple regulatory agencies. In particular, for example, they may be subject to requirements of reporting their holdings, or positions, in individual securities, and or securities issued by individual entities, when their holdings in such securities exceed threshold amounts, either in absolute or relative terms.

It can particularly important that holdings by commonly-controlled or otherwise-related entities be monitored in real time, or on a continual or periodic basis, where such entities desire to trade securities in the largest permissible amounts while avoiding reporting requirements. Such financial institutions often accomplish these purposes using multiple special-purpose or stand-alone systems to generate, store and manipulate data signals representing such securities and related information.

SUMMARY

In various aspects the invention provides systems, methods, and computer-executable instruction mechanisms (e.g., non-transient machine-readable programming structures) for receiving from processors operated by or on behalf of each of a plurality of commonly-controlled entities, or commonly-controlled-entity systems, signals representing holdings, and/or reports of holdings, of pluralities of securities held by the respective entity; preparing data records representing collated and aggregated totals of securities held by the plurality of commonly-controlled entities; accessing in machine-readable storage associated with the data processor data structures representing requirements imposed by one or more regulatory agencies; using the accessed data structures, determining a level of holdings, which may be a relative level of holdings, for one or more individual securities held by the plurality of commonly-controlled entities; and storing data representing the determined relative levels in machine-readable memory.

Such systems, methods, and/or instructions or programming structures can be configured for periodically receiving from each of the plurality of commonly-controlled-entity systems signals representing one or more reports of holdings of pluralities of securities held by the respective entity, and for providing to an administrator system signals suitable for causing the administrator system to provide an alert indicating that the relative level of holdings of at least one of the securities held by the plurality of commonly-controlled entities has exceeded one or more pre-defined thresholds. Such pre-defined thresholds can correspond to any desired or required early warning level(s), such as 75% of, or the entirety of, a regulatorily-imposed threshold level. Such systems, methods, and instructions can further be configured to generate data representing a regulatory compliance report when the relative level of holdings of at least one of the securities held by the plurality of commonly-controlled entities has exceeded a pre-defined threshold, and/or to transmit such report to communications resources representing one or more regulatory compliance addresses.

Such systems, methods, and/or programming structures can be used for other purposes as well, for example, for assessing in advance consequences of proposed transactions in financial interests, such as, for example, determining in advance whether a proposed transaction in a financial interest will cause an entity's holdings to cross a regulatory, statutory, or self-imposed threshold; that is, to provide preclearance for the transaction.

BRIEF DESCRIPTION OF THE DRAWINGS

Reference will now be made, by way of example, to the accompanying drawings which show example embodiments of the present application, and in which:

FIG. 1 shows a schematic diagram of an example system for tracking securities holdings or other financial interests in accordance with the disclosure herein.

FIGS. 7-11 provide schematic illustrations of examples of user interface screens suitable for use in controlling systems and processes according to the invention, and for presenting output generated by such processes.

DESCRIPTION OF EXAMPLE EMBODIMENTS

Figure 2:
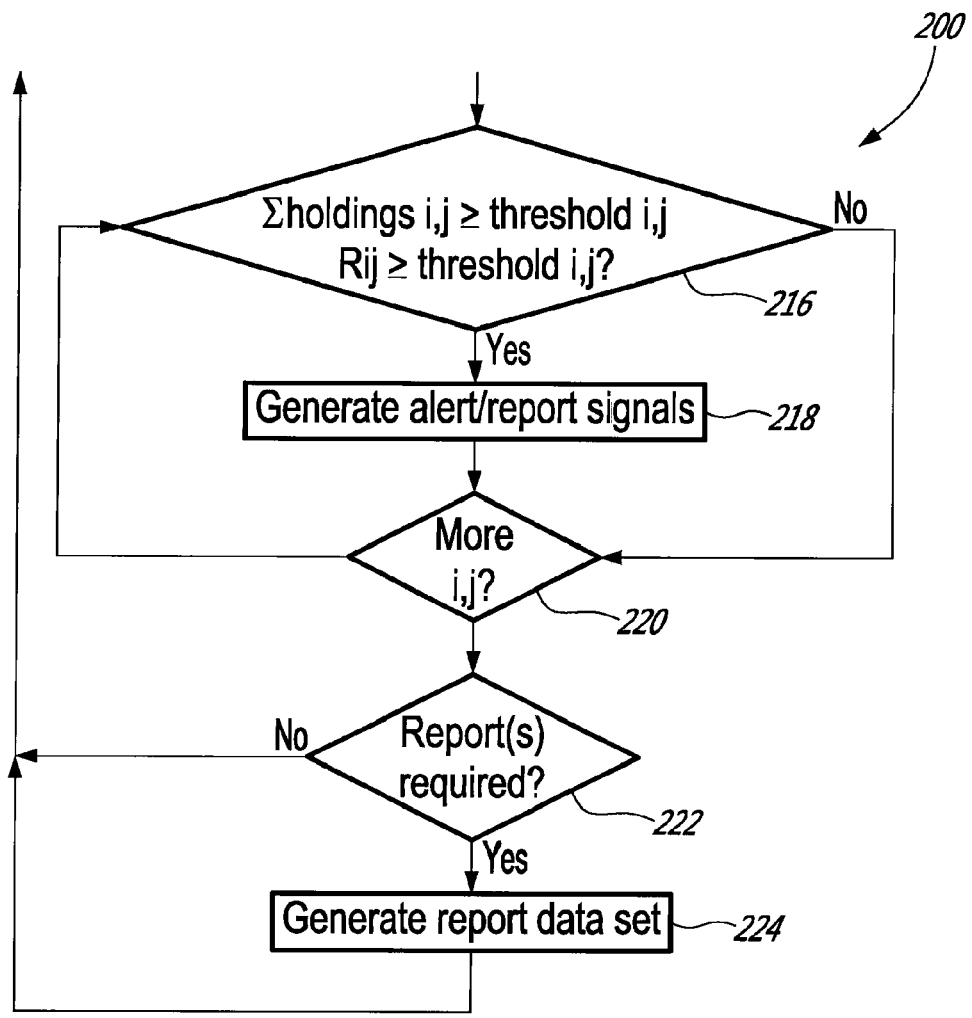
FIG. 2 is a schematic flow diagram of an embodiment of a process for processing data relating to securities holdings or other financial interests in accordance with the disclosure herein.

Reference is now made to FIG. 1, which shows, in block diagram form, an example of a signal processing system 100 suitable for use in tracking security holdings in relation to a plurality of regulatory systems, for example for use in monitoring regulatory compliance across pluralities of regulatory frameworks, in accordance with the disclosure herein. In the embodiment shown, system 100 comprises parent- or other controlling-entity system 102, which is associated with one or more of its operating units or otherwise-controlled entities and their associated controlled-entity systems, or subsystems, 110. In some embodiments, a controlling entity system 102 may operated by, or on behalf of, a financial institution such as a bank, and the one or more operating units or controlled entity systems 110 may operated by, or on behalf of, subsidiaries or branches of the financial institution, such as mutual fund companies, brokerages and/or investment administrators. System 100 can further comprise one or more securities information sources 130 and one or more regulatory systems 120, as well as any number of administrator systems or subsystems 106.

Each operating unit or other commonly-controlled-entity (sub)system 110 collects information regarding its security holdings and reports it to one or more controlling-entity system(s) 102. For example, a commonly-controlled-entity (sub)system 110 can electronically track securities bought, sold, and/or otherwise controlled by a corresponding controlled entity during a trading day, and can store data representing such securities holdings in one or more databases or other memory(ies) 112 associated with such entity 110. Data representing securities held by entities associated with controlled-entity systems 110 can, for example, include identifiers associated with the entity(ies) holding the security(ies), uniquely identifying the individual security(ies) (e.g., in the case of a bond, a CUSIP number), the number of units or total amount or value of the security(ies) held, and/or the date, time, and/or market, exchange, or other venue(s) through or within which such security(ies) were acquired.

Aggregation of such data by system(s) 110, and/or provision of such data to controlling-entity system(s) 102, may be performed continuously or periodically, such as, for example in real time or on a daily, weekly, or monthly schedule, and/or on demand.

To facilitate such and other communications processes, system(s) 110 operated by or on behalf of such operating units or controlled entities may be in digital electronic or other electromagnetic communication with controlling entity system(s) 102 through one or more wired or wireless communication networks 116 such as, for example, public switched telephone network(s) (PSTN(s)) or public land mobile network(s) (PLMN(s)). Network(s) 116 can include open or secure private and/or public networks such as private electronic communications networks (ECNs) and/or the Internet.

Information received from (sub)systems 110 can be provided by those system(s) in single or multiple formats, i.e., received in diverse or coordinate formats, or according to diverse or coordinated protocols. As will be understood by those skilled in the relevant arts, in some instances all systems 110 operated by or on behalf of commonly-controlled entities associated with a single controlling entity system 102 will exchange data according to a common format or protocol. However, it may also happen that one or more such systems 110 exchange data with corresponding system(s) 102 according to multiple, individualized formats, or protocols. In the latter case, once the controlling entity system 102 has received the security holdings data from the (sub)system(s) 110, it may translate the received data into a common format for further processing, such as collation and aggregation, according to a single protocol as desired. The well-known Financial Information eXchange (FIX) and Financial products Markup Language (FpML) protocols are examples of communications protocols that may be used, separately or in combination.

As will be understood by those skilled in the relevant arts, data transferred between (sub)systems 110 and system 102 can be pushed and/or pulled from either end of the involved communications stream(s), depending upon the data processing requirements and preferences of the corresponding systems 102, 110, and their administrative processes.

Systems 100 further can comprise, or otherwise interact with, one or more security(ies) information services or systems 130. Information systems 130 may, for example, provide a controlling entity system 102 and/or controlled-entity (sub)systems 110 with information regarding the numbers and identities of individual of securities which are available for trading, or otherwise exist, within worldwide, local, or other market(s). For example, a security information service 130 may include digital data feeds or other electronic reporting services provided by, for example, Bloomberg, Thomson-Reuters, Telekurs, or other news reporting service.

System 100 may comprise, or interact with, data processing and/or digital communications systems 120 controlled by or otherwise associated with one or more securities and/or other regulators from one or more jurisdictions. For example, regulators 120 may comprise one or more Canadian provincial securities commissions such as, for example, the Ontario Securities Commission. The regulators 120 may also include for example, the Securities and Exchange Commission (SEC) of the United States, the Financial Services Authority (FSA) of the UK, various stock exchanges such as the Toronto Stock Exchange (TSE) or the New York Stock Exchange (NYSE), and/or well as self-regulatory bodies such as, for example, NASD, IROC, MFDA. Regulators 120 may provide market information feeds to the controlling entity 102.

It is well known in the financial services industry that regulations, which may vary from time to time and jurisdiction to jurisdiction, are implemented for the regulation, monitoring, and control of equity and other security holdings of financial institutions and other entities. A regulatory body responsible for a jurisdiction may have specific and distinct definitions and requirements regarding what may need to be reported with respect to the holding of securities, and how local, international, and/or worldwide security holdings of an institution or entity may or must be calculated. Thus a system 100 may comprise one or more securities or regulatory reference databases 104, which may include information regarding regulations in various jurisdictions such as those from regulators 120, and which are accessible by controlling entity system 102. Regulatory reference database(s) 104 may be controlled by or on behalf of the controlling entity(ies) associated with system(s) 102, and/or other parties. For example, a controlling entity may derive data processing rules reflecting reporting requirements in one or more jurisdictions in which any controlled entity(ies) trade, or may trade, based on regulations and/or other rules promulgated by authorities in such jurisdictions, reduce representations of such requirements to machine-readable instructions such as compiled computer code and/or storeable data, and store such machine-readable instructions and/or data in one or more databases 120, for use by controlling-entity system(s) 102 in monitoring compliance therewith.

A controlling entity operating a controlling-entity (sub) system 102 may collate securities holding data received from operating unit (sub)systems 110, so that one or more distinct securities held by any of the controlled entities may be uniquely identified, regardless for example of the source from which the security was acquired (for example, regardless of whether the security was purchased on the London, New York, Tokyo, or Toronto exchanges), and aggregated, so that the total holdings controlled by the controlling entity 102 may be determined, both, for example, on an individual security basis (i.e, according to unique CUSIP numbers) and/or according to the issuing entity. For example, a particular fixed income security can be collated according to its individual CUSIP number, and aggregated according to the individual (CUSIP) issue and/or by issuer. Thus the holdings of entities 110 controlled by an entity 120 can be totaled by individual security and/or by the issuer (i.e. the company or bank which issued a bond).

As will be understood by those skilled in the relevant arts, any data or criteria suitable for uniquely identifying a bond, equity interest, or other interest may be used in implementing this aspect of the invention. As previously noted, CUSIP numbers are suitable for use in uniquely identifying bonds by issue, and therefore, indirectly, by issuer. The acronym CUSIP refers to alphanumeric identifiers uniquely assigned by the Committee on Uniform Security Identification Procedures to all North American securities issues, for, for example, the purposes of facilitating clearing and settlement of trades. Further examples of suitable identifiers include International Securities Identification Numbers (ISINs), which are defined in ISO 6166 for bonds, commercial paper, equities and warrants; and Stock Exchange Daily Official List numbers (SEDOLs), which are frequently used in the United Kingdom and in Ireland. As described herein, such identifiers may be provided, and processed, in the form of suitably-configured alpha-numeric data fields in suitably-configured data records provided by, for example, (sub)systems 110, according to any suitable formats or protocols.

Collated and aggregated holdings data may be compared to total relevant issued shares, issue volumes, market values, and/or other totals for individual holdings, issuers, and/or other criteria according to requirements established by the relevant regulatory agency(ies), and the absolute and/or relative level(s) or amount(s) of such holdings may be determined. Such levels or amounts may be determined in absolute and/or relative terms. For example, data received from one or more controlled-entity (sub)systems 110 can be used to represent amounts held or otherwise controlled by the corresponding controlling entity(ies) 102 in a numerator of a determined a ratio, as a measure of relative levels or concentrations of ownership measured against an indication of total shares outstanding in one or more relevant defined markets (e.g., local or worldwide) received from security information service(s) 130; in such cases information received from one or more securities information services 130 representing a total of outstanding shares within the relevant market(s) can be used as a denominator.

Each regulatory body or agency 120 may require a different numerator and/or denominator to be used in making such determinations. Information regarding the required numerator and denominator for such calculation(s) may, for example, be provided in regulatory reference database(s) 104. Such information may be used to create straight- or modified-ratio measures for compliance with any or all of the various regulations of the various regulators corresponding to regulator (sub)systems 120.

When a ratio, or relative, measure has been determined, information may then be sent to one or more administrator system(s), or application(s), 106. Information sent to administrator system(s) 106 may include, for example, the determined ratio(s) as well as, optionally, one or more alerts or other indications that reporting may be required regarding one or more of the equities securities held by one or more entities associated with the controlling entity 102. It may then be a function of the administrator system(s) 106 to determine what an appropriate further action, if any, could or should be, such as deciding whether or not reporting in compliance with any one or more regulatory requirements is required. Alternatively, a controlling entity 102 may make such a determination and pass information regarding the required action to the administrator system(s) 106. If reporting is required to, for example, one of the regulators 120, the controlling entity 102 may create a report and submit that report to the administrators system 106 or the administrators system may create the report using the information received from the controlling entity 102.

Administrator system(s) 106 may, for example, be operated by, or on behalf of, a controlling entity on whose behalf controlling entity (sub)system(s) 102 is operated.

The tracking of equity and/or other securities holdings of complex entities such as a corporation having multiple subsidiaries within its control may be performed at either the unit and/or enterprise levels. Thus holdings of such securities, and/or other financial interests, may be tracked by commonly-controlled entities such as those associated with commonly-controlled-entity (sub)systems 110, and by parent or other controlling entity 102.

The various components and subsystems of system 100 may comprise any automatic data processors, telecommunications devices, and supporting equipment, adapted to execute suitably-configured machine-executable instruction sets, suitable for accomplishing the purposes described herein. A wide variety of such components and equipment is now known, and doubtless will hereafter be developed. The identification and selection of suitable components will not trouble such skilled persons. Such systems, subsystems, and components may be implemented in any form(s) of hardware, software, and/or firmware suitable for accomplishing the purposes described herein. For example, any or all of systems 102, 104, 106, 110, 112 and/or processes executed by them may be implemented as distinct servers and their associated application programs, or any or all of them may be implemented by single server, mainframe, or desktop-class computers implementing unified or partitioned applications sets. Thus the invention may be implemented in the form of a unified or distributed processing system.

In particular, any one or more of (sub)systems 102, 110, 106 of system(s) 100 may be implemented in any desired separate or combined form(s). For example, any or all of such systems may be implemented in the form of remotely-located (sub)systems comprising separate computers or other data processing systems, communicating with one or more central/host controlling-entity systems. Alternatively, any or all of (sub)systems 102, 110, 106 may be implemented as separate or combined program applications on one or more single computer systems, in concentrated or distributed processing schemes. As a further example, one or more administrator system(s) 106 can be implemented as stand-alone remote and/or centrally-located computer systems, and/or as remotely-located systems and/or applications on any one or more of (sub)system(s) 110, 102. As used herein, unless otherwise clearly required by context, "system" and/or "subsystem" apply both to distinct computing or other data processing hardware, and/or to separate or combined-function application programs.

Thus in various embodiments the invention provides systems 100, and methods and/or programming structures (or other machine-executable instructions) implemented by such systems, useful for aggregating securities holdings held by a plurality of commonly-controlled entities, comprising one or more data processors 102 configured for receiving from each of a plurality of commonly-controlled entity (sub)systems 110 signals representing one or more reports of holdings of pluralities of securities held by the respective entity; preparing data records representing collated and aggregated totals of securities held by the plurality of commonly-controlled entities; accessing in machine-readable storage 104 associated with the at least one data processor 102 data structures representing requirements imposed by one or more regulatory agencies; using the accessed data structures, determining a relative level of holdings for one or more individual securities held by the plurality of commonly-controlled entities; and storing data representing the determined relative levels in machine-readable memory.

An example of a process 200 in accordance with method aspects of the invention, suitable for implementation using a system 100 according to the invention, is shown in FIG. 2. Such a process 200 can be considered to begin at 200, upon receipt by a controlling-entity system 102 of signals representing holdings data from one or more controlled-entity (sub)systems 110 operated by or on behalf of entities owned or otherwise controlled by a parent or other entity associated with the system 102. For example, the controlling entity system 102 can periodically poll one or more controlled-entity (sub)systems 110, and thereafter pull or received pushed data from polled systems 110, and/or one or more (sub)systems 110 can provide real-time, delayed, or other continuous, periodic, or other push-type feeds of such data to the system 102. Thus holdings data can be gathered by system 102 in, for example, batch, real-time, periodic, or other processes.

As a further example, as explained herein process 200 can be initiated at the request of a user of a system 102, 106. For example, such a user may input a suitably-configured system command in order to start a process 200 in order to monitor or otherwise check compliance with regulations of one or more jurisdictions, e.g., to determine whether a proposed transaction (e.g., a sale or purchase of one or more securities or other interests) will raise issues with respect to regulations in place in any one or more jurisdictions, etc.

Figure 3:
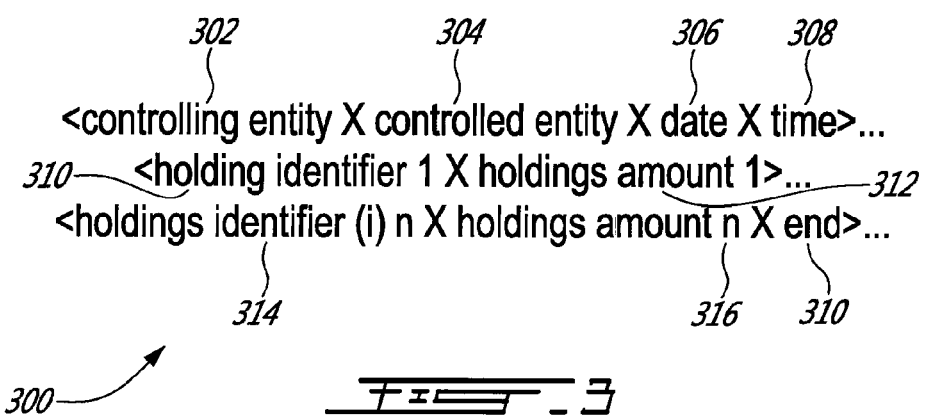
FIG. 3 is a schematic diagram of a data record suitable for use in processing data relating to securities holdings or other financial interests in accordance with the disclosure herein.

FIG. 3 is a schematic diagram of a data record, or a portion of a data record, 300 suitable for use in processing data relating to securities holdings or other financial interests in accordance with the disclosure herein. Data record 300 is suitable for use, for example, in communicating to a controlling entity system 102 the identity(ies) of one or more securities or other financial interests held by an entity controlled by the controlling entity associated with the system 102. Data record 300 may, for example, be generated for that purpose by a controlled-entity (sub)system 110.

In the embodiment shown in FIG. 3, data record or data record portion 300 comprises a plurality of data fields 302, 304, 306, etc., adapted for communicating data representing information relevant to holdings of a plurality of securities or other financial interests. In the embodiment shown, for example:

Field 302, <controlling entity>, comprises data directly or indirectly identifying the entity which controls the controlled entity which holds the corresponding financial interest(s). Such data can, for example, include a coded uniform resource locator (URL) or other address data such as is commonly included in a data record header.

Field 304, <controlled entity>, comprises data directly or indirectly identifying the controlled entity which holds the respective financial interest(s), and which may have generated the record or record portion 300. Such data can, for example, include a coded uniform resource locator (URL) or other address data such as is commonly included in a data record header.

Fields 306 and 308, <date> and <time>, can comprise data indicating the date and/or time at which the corresponding interests were held, and/or at which the record or record portion 300 was generated. Alternatively, for example, fields 306 and 308 can be omitted, and the receiving controlling entity system 102 can provide a date/time stamp indicating the date/time at which the record or record portion 300 was received.

Field 310, <holdings identifier (i) 1>, can comprise data identifying the security or other financial interest, the holding of which is reported by the record or record portion 300. The holding of pluralities of interests can be reported singly or in groups. In embodiments in which a plurality of holdings are reported through the use of a single record or record portion 300, field 310 can provide such data for a first security or interest. Data identifying the security or other interest can comprise any information useful in identifying the security or interest, preferably uniquely. For example, data representing a CUSIP, ISIN, or other identifier originated by a third party may be provided, or an internally-developed identifier may be used. In some embodiments, as noted herein, both internally-assigned and externally-assigned numbers may be used, and cross-referenced as appropriate.

Field 312, <holdings amount 1>, can comprise data identifying the amount of the security or other financial interest identified in field 310 held by the corresponding controlled entity. This amount may sometimes be referred to as the 'position' of the controlled or controlling entity in the identified security or other interest. In embodiments in which a plurality of holdings are reported through the use of a single record or record portion 300, field 312 can provide such data for a first security or interest. Data identifying the amount of the security or other interest held can be represented in numbers of units held (e.g., a number of specific stock or bond issues), or in dollar or other monetary value of holdings.

One or more fields 314, <holdings identifier n>, in embodiments in which holdings of interests are reported in groups, can comprise data identifying a subsequent held interest in, for example, the manner described above for field 310.

One or more fields 316, <holdings amount (i) n>, in embodiments in which holdings of interests are reported in groups, can comprise data identifying a the amount of a subsequent interest held by the reporting controlled entity in, for example, the manner described above for field 314.

Field 318 can comprise an end-of-record or other suitable identifier indicating that data relating to the holdings of securities, or holdings of securities of a given type, is complete. In some embodiments of the invention, holdings relating to a second type of interest held by the same commonly-controlled entity(ies) may be initiated. For example, if records 310-316 relate to holdings in equity interests, a suitable identifier and further suitably-formatted records related to a second type of holdings, e.g, bonds or other debt holdings, can be provided, and followed by corresponding identifier and amount items 310-316.

Examples of further fields that can be provided in data record(s) or data portion(s) 300 comprise for processing in accordance with the invention include:

Portfolio Account Number: for controlled entities such as brokerages that hold multiple portfolios, for example, on behalf of third parties, or for other reasons, one or more fields can be provided for identifiers useful for identifying a security or other interest as belonging to or otherwise associated with a specific portfolio.

External Interest Identifier: in embodiments in which a controlling entity and/or one or more controlled entities use internally-assigned interest identifiers (e.g., fields 310, 314), an external identifier assigned by a third party may be provided, for use in collating and cross-referencing interests held by multiple entities. Such an identifier can comprise, for example, a CUSIP, ISIN, or other number.

Interest Identifier Type: Where one or more of a controlling entity and its associated commonly-controlled entities hold interests of different types (e.g., bonds, stocks, negotiable instruments, etc.), identifier(s) of the type9s) of interest to which the record(s) or record portion(s) 300 apply may be provided.

Beneficial Ownership Code: Where interest(s) held by one or more of a controlling entity and its associated commonly-controlled entities may be held according to more than one type of beneficial interest, or on behalf of one or more third parties, a suitable identifier may be provided, for use in application of rules provided from data base(s) 104. Such identifier(s) may identify the party(ies) on whose behalf the interest is held.

Discretionary Code: Where interest(s) held by one or more of a controlling entity and its associated commonly-controlled entities may held for the benefit of other parties, but with discretionary powers such as the right to buy or sell the interest on behalf of the beneficial owner, suitable identifier(s) may be provided.

Transaction Type: The nature of the transaction reported (e.g., buy, sell, borrow, loan, short or long, etc.). Such information can be used for both aggregating amounts actually, preclearance and/or other considerations of proposed transactions prior to execution; and for determining whether a particular quantity or amount of a corresponding interest should be aggregated under one or more particular sets of rules or regulations.

Exclusion code: A flag or other identifier adapted for allowing a specific interest, type of interest, or class of interests to be excluded from aggregation in view of statutory, regulatory, or other criteria, or at the discretion of the entity(ies) initiating or conducting the process 200.

Data Source Code: Can be used to identify a source of a particular data record 300, or other related information, or one or more streams thereof, including for example source(s) 130.

Voting Control Code: A flag or other identifier for identifying whether and/or what type of voting rights a reporting entity has in a reported interest.

Exchange Identifier: Identifies the exchange or other market(s) in which a reported interest was acquired, or may be traded.

As will be appreciated by those skilled in the relevant arts, data record(s) or record portion(s) 300 can be provided and processed in according to any format or protocol suitable for use in accomplishing the purposes described herein, including, for example, the FIX and/or FpML formats as previously mentioned.

Having received one or more such records at 202, the receiving system(s) 102 can write them to temporary or persistent storage, such as a buffer or long-term memory 103, for further processing. At 204, any further holdings data may be received, in the same manner used at 202 or in any other suitable manner. For example, the same and/or any other controlled-entity (sub)systems 110 can be polled for available data; or, where (sub)systems 110 provide holdings data feeds, any available holdings data can be received.

If no further data is available, or no further data is to be collected at this time, or if all holdings data relevant to a specific request entered by a user of a system 102, 106, has been received, at 206 any holdings data collected at 202, including any previously-received data held in and retrieved from buffer or other memory, can be collated and aggregated. Data records 300 can be collated individually, as they are received at 202, and collated data stored; and/or corresponding data may be held in temporary or long term storage for periodic or other batch processing. A controlling entity operating a controlling-entity (sub)system 102 may, for example, collate securities holding data received in such manner that beneficial ownership or control, or other holding, for each individual securities issue may be tracked, regardless for example of the source from which the security was acquired (for example, regardless of whether the security was purchased on the London, New York, Tokyo, or Toronto exchanges), and aggregated, so that the total holdings controlled by the controlling entity 102 may be determined, both, for example, on an individual security basis (i.e, according to unique CUSIP numbers) or according to the issuing entity. For example, a particular fixed income security can be collated and aggregated according to its individual CUSIP number and/or by issuer, and/or by other desired criteria. Thus the holdings of entities 110 controlled by an entity 120 can be totaled by individual security, by the issuer (i.e. the company or bank which issued a bond), or by other desired criteria.

In embodiments of the invention in which interests held by controlled entities which employ different means of identifying held interests, collating at 206 can comprise cross-referencing identifiers 310, 314 against multiple listing tables using, for example, suitable table look-up procedures. For example, a single interest may have been assigned, and may be identified using, one or more CUSIP, ISIN, SEDOL, and/or ADP numbers, and/or internal reference numbers assigned by a controlling entity 102, 106. By suitable cross-referencing techniques, such securities may be identified as equivalent and appropriately collated. In some embodiments, interests comprising multiple equivalent reference numbers may be cross-referenced for unique identification, and where proper matching fails, or mismatches or other anomalies are detected, identifications can be referred for application of human or automatic verification processes.

Such collation, and aggregation, can be performed on a continuous, periodic, or other automatic or ongoing basis, and/or on demand of a user of for example an administrative and/or controlling entity system 102, 106.

For example, at 206 one or more systems 102, 106 can review individual data records 300 stored in associated memory(ies) 103, to sum for each individual security or other interest i the total current or historical holdings thereof.

When for any specific interest i all relevant records 300, etc., have been reviewed and total holdings calculated, at 208 a determination may be made whether further interest holdings totals are to be determined, by for example referring to a specific request entered by a user of a system 102, 106 or by reference to a batch processing order, with a corresponding identifier (e.g, CUSIP number) i being incremented until all relevant interests have been totaled. If further interests remain to be aggregated, control can return to process 206 until all relevant holdings have been determined.

Holdings may be aggregated at 206 to determine total current and/or historical holdings of individual securities, or pluralities and/or various combinations thereof. Such holdings may be aggregated on a current basis by, for example, receipt from (sub)systems 110 total current holdings, or by tracking purchase and sales transactions on an ongoing basis, etc. Historical holdings, i.e., holdings at any desired point in time, can be tracked using, for example, date and time fields 306, 308.

When all holdings (i) related to a given batch or special request have been aggregated, and any corresponding aggregated holdings data has been stored in memory associated with the relevant processor(s) 102, 106, at 210 system 102 can access in one or more memories 104 holdings rules data relevant to any or all jurisdictions (j) corresponding to the current processing request. For example, where a batch or specific request is being processed to determine current or prospective reporting or other obligations related to the United States, the Province of Ontario, the United Kingdom, and/or any other jurisdiction, an appropriately-structured query can be made of one or more rules database(s) 104 to determine reporting requirements and rules relevant to any holdings of securities or other interests related to the current processing request. For each interest i held by any one or more relevant controlled entities, data may be accessed indicating what, if any, further information relevant to reporting or control-monitoring requirements is needed in order to ensure that proper regulatory compliance is observed for each holding i within each relevant jurisdiction j. For example, in jurisdiction(s) where percentage ownership or control of one or more interests must be reported, when various thresholds of ownership and/or control are surpassed, it may be necessary to obtain data indicating total market availability, or total issued quantities, of relevant interests worldwide, or in one or more individual jurisdictions or markets, so that such data may be used in determining relevant levels of holdings in corresponding jurisdictions or markets. In general, it may be expected that sources and relevant markets of holdings to be monitored/reported may vary from jurisdiction to jurisdiction.

Specific types of data 302-316, etc., required to apply applicable rules in determining any reporting or other regulatory requirements may vary according to, inter alia, jurisdiction and/or to type(s) of interest held, and may be acquired by system(s) 102, 106 from various sources, including for example controlled-entity (sub)systems 110 and/or securities or market information services 130, and memory(ies) and data source(s) associated therewith. Data typically required to represent the following types of information in determining requirements for current or prospective compliance can, for example, include:

The specific identity of the interest (e.g., CUSIP number).
The issuer of the interest.
Proprietary or discretionary positions, or both: whether a specific interest is held for an entity's own benefit, or managed on behalf of another, with discretion to buy or sell on behalf of the client.
Whether an applicable rule or regulation is directed toward ownership by issue (i.e., specific interest, such as issue of bond or stock) versus issuer (i.e., the company or other entity which created the interest.
Whether an interest is held subject to a loan agreement, for example to cover short buying or selling.
Convertible security inclusion or exclusion: many regulations control reporting of interest that may be convertible to preferred stocks or holdings, by requiring that such interests be counted as the equivalent of the interest into which they may be convertible.
Whether the security represents an option to buy or sell an interest: in various regulatory schemes, such interests may, in various circumstances, be treated as actual, presently-owned shares, according to rules set forth therein.
Reporting thresholds: the percent ownership threshold often associated by a statute or regulation with a reporting requirement, as related to one or more specific interests, types of interests, and/or classes of interests. Moreover, internally-set thresholds may be provided by a controlling or controlled entity, for example to cause alerts to be issued if/when reporting thresholds are approached.
Whether a given interest or class of interests, or holdings or types of holdings, is exempt from reporting requirements. For example, in some cases commonly-owned entities may be subject to 'information barriers' or other virtual walls, and exempted from common reporting requirements.

As will be understood by those skilled in the relevant arts, once they have been made familiar with this disclosure, depending upon the instruction sets (e.g., applications or other programming structures) used to implement such aspects of the invention, some or all of such information may be provided through the use of suitable flag values in corresponding items in data records formatted according to suitably-configured protocols. In other cases, codes, identifiers, and/or other alpha-numeric or other symbols may be used.

When rules relevant to pending inquiries have been accessed for each affected jurisdiction j, and have been parsed to determine relevant types and/or classes of data required, and/or processing rules to be applied, or desirable for use in monitoring and/or reporting holdings levels, at 212 processor (s) 102, 106 can receive from one or more market information sources 130 relevant data. Such market data can, for example, include total quantities or volumes of individual interests (i), classes of interests, or interests issued by one or more issuers, outstanding in one or more relevant markets, or in one or more relevant jurisdictions (j). For example, data indicating total volumes or quantities of equity or debt issues (e.g., stocks or bonds) previously issued or owned by other entities or otherwise available on a single market such as the NYSE, or owned and/or available worldwide may be requested by the system 102, or pushed periodically pushed to the system 102 by one or more services 103. Such quantity or volume data can be used by the system 102 to determine a total relevant market quantity associated with each relevant interest i. Suitable data structures, such as database arrays, may be used for temporary or long-term storage of relevant data.

At 214, for each relevant interest (i), absolute and/or relative levels ($R_{i,j}$) of holdings may be determined with respect to each relevant jurisdiction (j), using rules applicable to such interests and jurisdictions as accessed in data store(s) 104. For example, a simple percentage or ratio of quantities or volumes of a security or other interest held by relevant entity(ies) to a total market relevant to one or more jurisdictions' relevant rules, may be determined. In many jurisdictions, straight ratios are not used, but rather specialized calculations, which may require consideration of classes of securities, types of controlling and/or controlled entities, and/or types of beneficial ownership or control. Such considerations may be implemented through the use of appropriately configured data records or fields within data record(s) 300, populated for example by suitable data or flags.

Collated and aggregated holdings data may be compared to total relevant issued shares, issue volumes, market values, or other totals for individual holdings, issuers, and/or other criteria according to requirements established by the relevant regulatory agency(ies) in each jurisdiction of interest, and the corresponding level or amount of such holdings may be determined. Such levels (or amounts) may be determined in absolute and/or relative terms. For example, data received from controlled-entity (sub)systems 110 can be used to represent amounts of interest(s) held or otherwise controlled by the corresponding entity(ies) 102 in a numerator of a determined a ratio, as a measure of relative levels or concentrations of ownership measured against an indication of total shares outstanding, on individual or multiple markets (e.g., locally or worldwide) received from security information service(s) 130, with the information received from the securities information services 130 representing a total of outstanding shares being used as a denominator. Each regulatory body or agency 120 may require a different numerator and/or denominator in making such determinations. Information regarding the required numerator and denominator for this calculation for each regulator 120 may be provided in regulatory or rules reference database(s) 104. Such information may be used to create a straight- or modified ratio measure for compliance with the various regulations of the various regulators corresponding to regulator (sub)systems 120.

When, for a given processing request, relevant absolute and/or relative levels ($R_{i,j}$) of holdings of each interest in each jurisdiction of interest have been determined, at 216 a determination may be made as to whether any specified thresholds have been surpassed. Any such thresholds, and any consequences of exceeding them, may be set or determined by any one or more relevant jurisdictions or regulatory authorities, by any administrator(s) of system 100, and/or by any user(s) of systems 102, 106 making a preclearance or other targeted inquiry. For example, thresholds may be set by any one or more such parties to warn of proximity to a position, e.g., that an administrative threshold warning of an approaching regulatory threshold has been passed; or that a regulatory threshold has in fact been passed.

Where at 216 it is determined that, with respect to any one or more securities or other interests i, any one or more regulatory, administrative, or inquiry thresholds have been surpassed, at 218 one or more signals useable by any one or more of (sub)systems 102, 106, 110 for generating an alert may be generated. For example, command and/or data signals representing an audio, printed, or other alert may be generated by a system 102, 106, and caused to be output on a display of, or e-mailed to a user of, any one or more of system(s) 102, 106, 110.

When, for example, a ratio measure ($R_{i,j}$) has been determined, information may be sent to one or more administrator system(s) 106. Information sent to administrator system(s) 106 may include, for example, the value of the ratio ($R_{i,j}$) as well as possibly one or more alerts or other indications that reporting may be required regarding one or more of the interests, or types or classes of interests, held by one or more entities associated with the controlling entity 102. It may then be a function of the administrator system(s) 106 to determine what an appropriate action could be, such as deciding whether or not reporting in compliance with one or more regulatory requirements is required. Alternatively, a controlling entity 102 may make such a determination and pass information regarding the required action to the administrator system(s) 106. If reporting is required to, for example, one of the regulators 120, the controlling entity 102 may create a report and submit that report to the administrators system 106 or the administrators system may create the report using the information received from the controlling entity 102.

When any required and/or desired alerts or other warnings have been generated at 218, it can be determined by any one or more of systems 102, 106 whether any corresponding or otherwise suitable or desired reports should be generated; and, if so, suitable data may be generated and forwarded to the corresponding system(s) 106, 102, 110. Such reports may be suitable for display on a display screen, and/or in textual form for printing, e-mailing, etc. Audio reports, such as generated synthetic voice messages, may be generated and forwarded to suitable users of the system 100, and/or to other parties.

When all desired processing has been completed with respect to any specific request, e.g., a timed regular batch request or a specific inquiry from a user of a system 106, 102, control can return to 202 for receipt and processing of another request.

Among the many advantages and opportunities offered by systems and methods according to the invention is the possibility of preclearing transactions in securities or other interests, so that any consequences of completion of a transaction may be known and accounted for in advance. For example, if a trader or administrator having access to a system 100 desires to know whether a transaction which will increase the ownership or other beneficial holdings in one or more securities by an entity will result in any reporting requirement or other regulatory consequence, such user(s) may initiate inquiry (ies) with respect to such interest(s) by inputting suitable interest identifiers (e.g., data useful for fields 310, 314) and a desired incremental amount, e.g., a desired purchase amount and causing a process 200 to be executed, whereby it may be determined what the effect of the proposed transaction will be in advance of execution of the transaction. In this way undesired or other reporting requirements, or other regulatory requirements, may controlled.

Figure 4A:
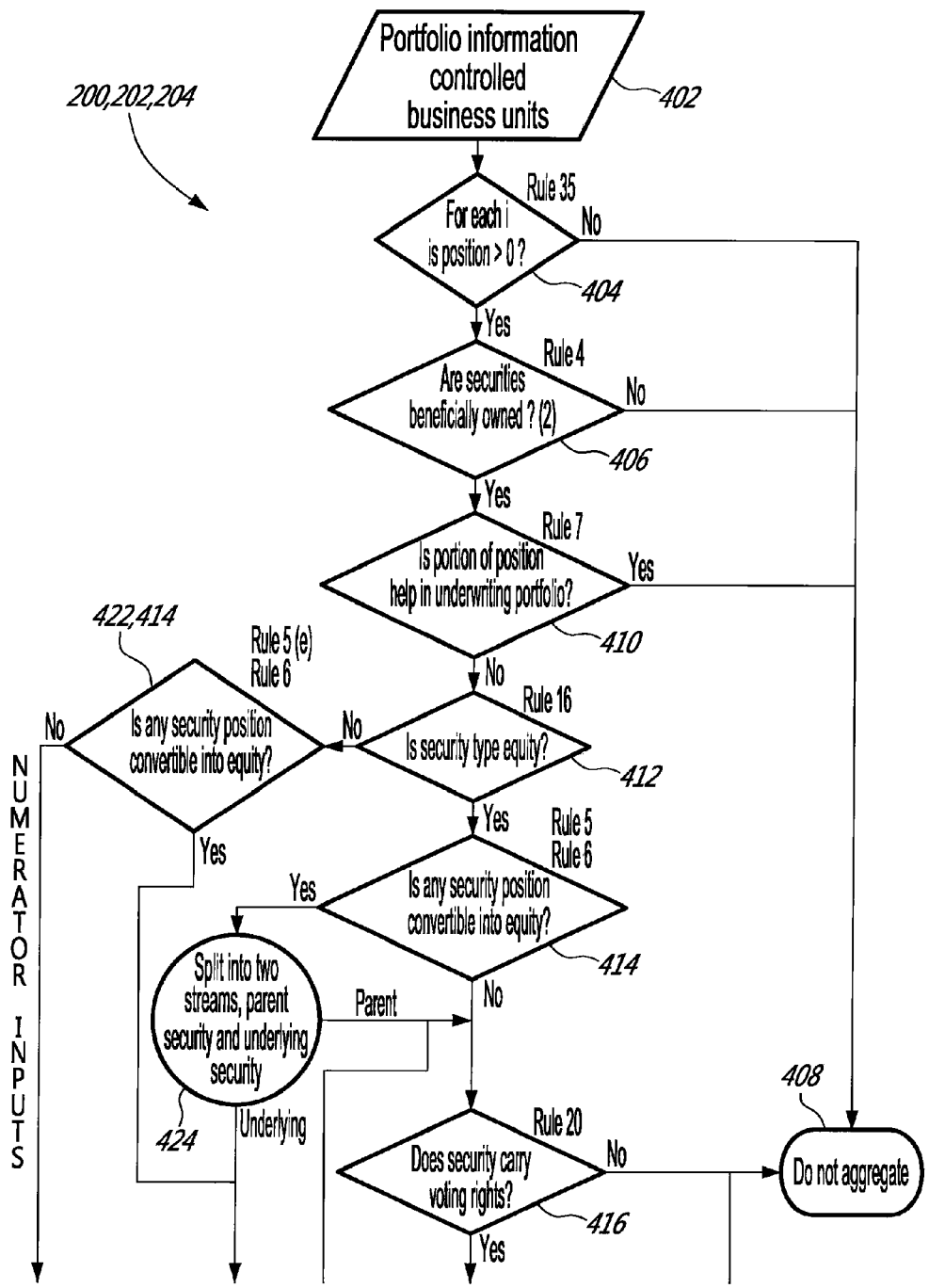
FIGS. 4-6 are schematic flow diagrams of embodiments of processes for processing data relating to securities holdings or other financial interests in accordance with the disclosure herein.
Figure 4B:
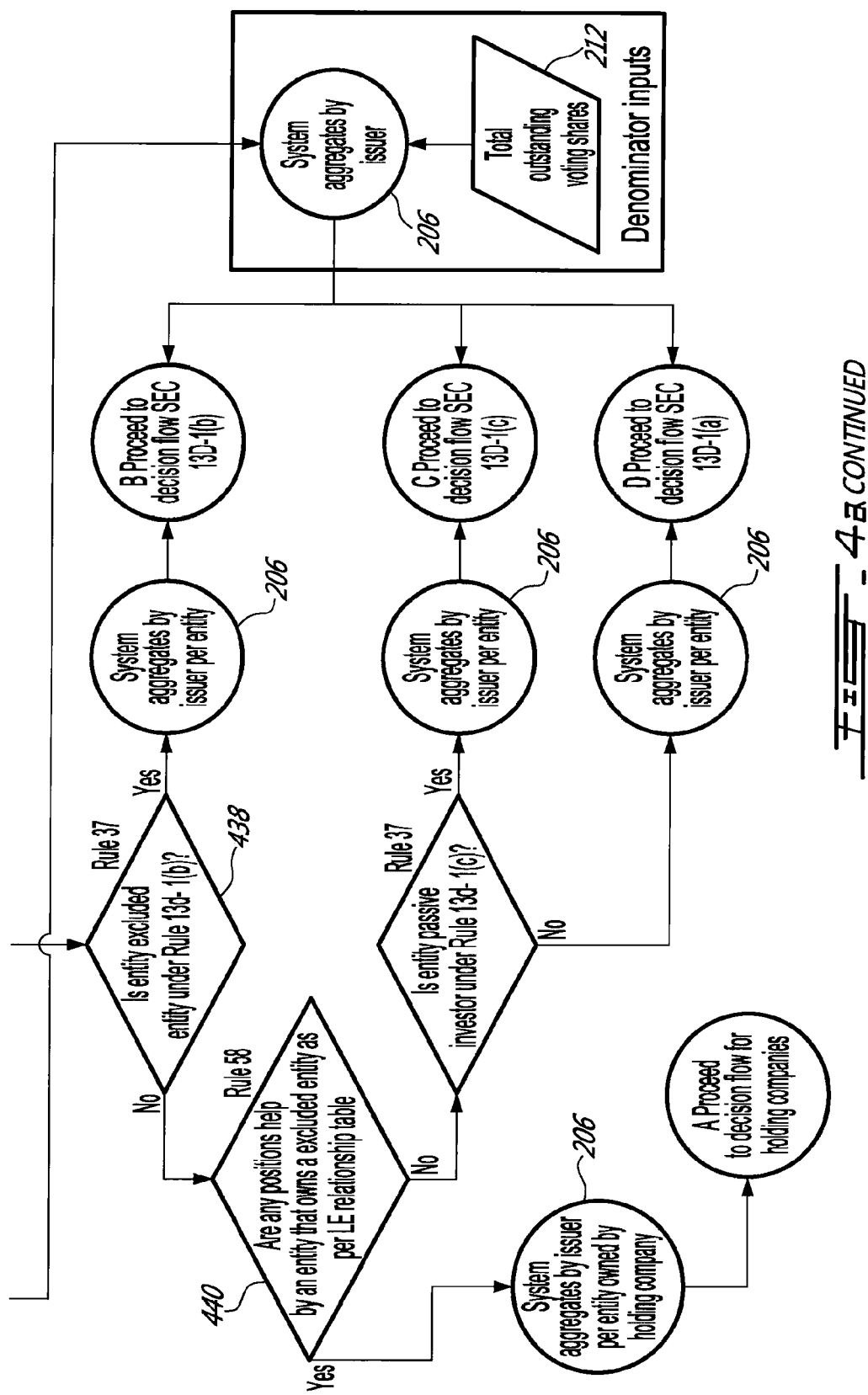
Figure 4B:
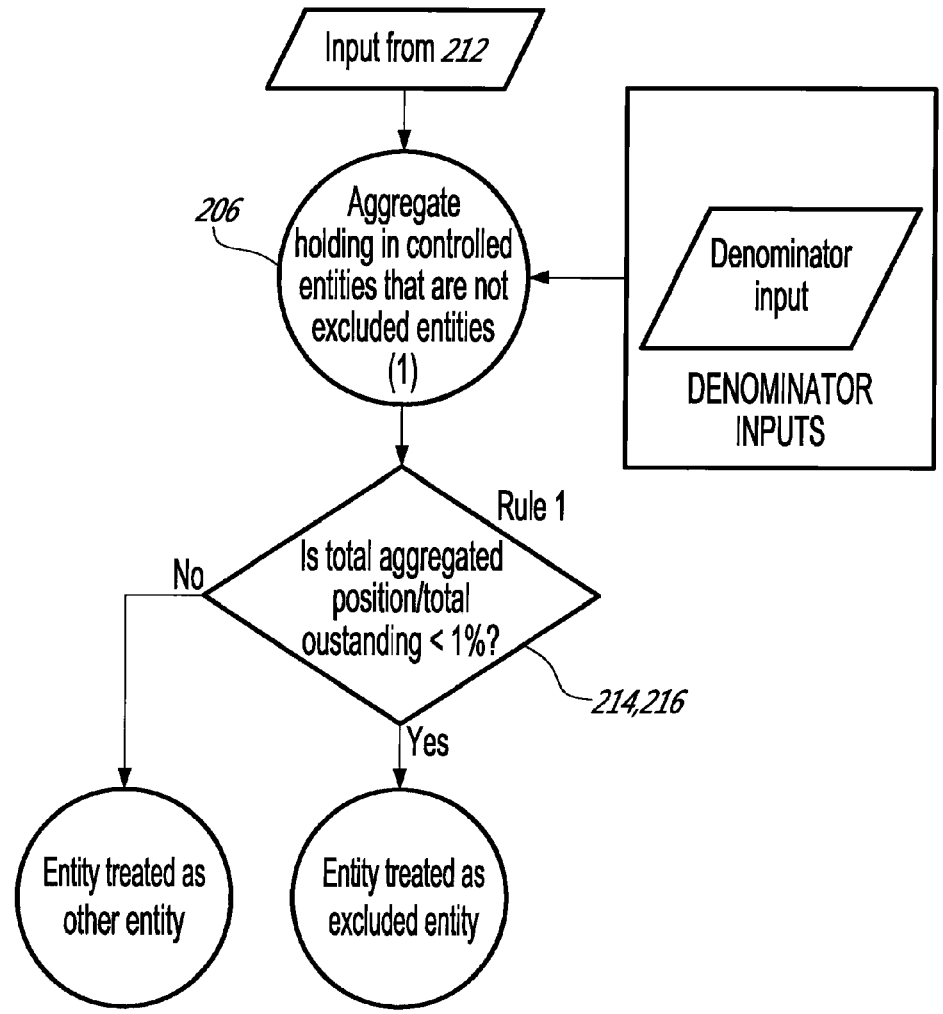
Figure 4C:
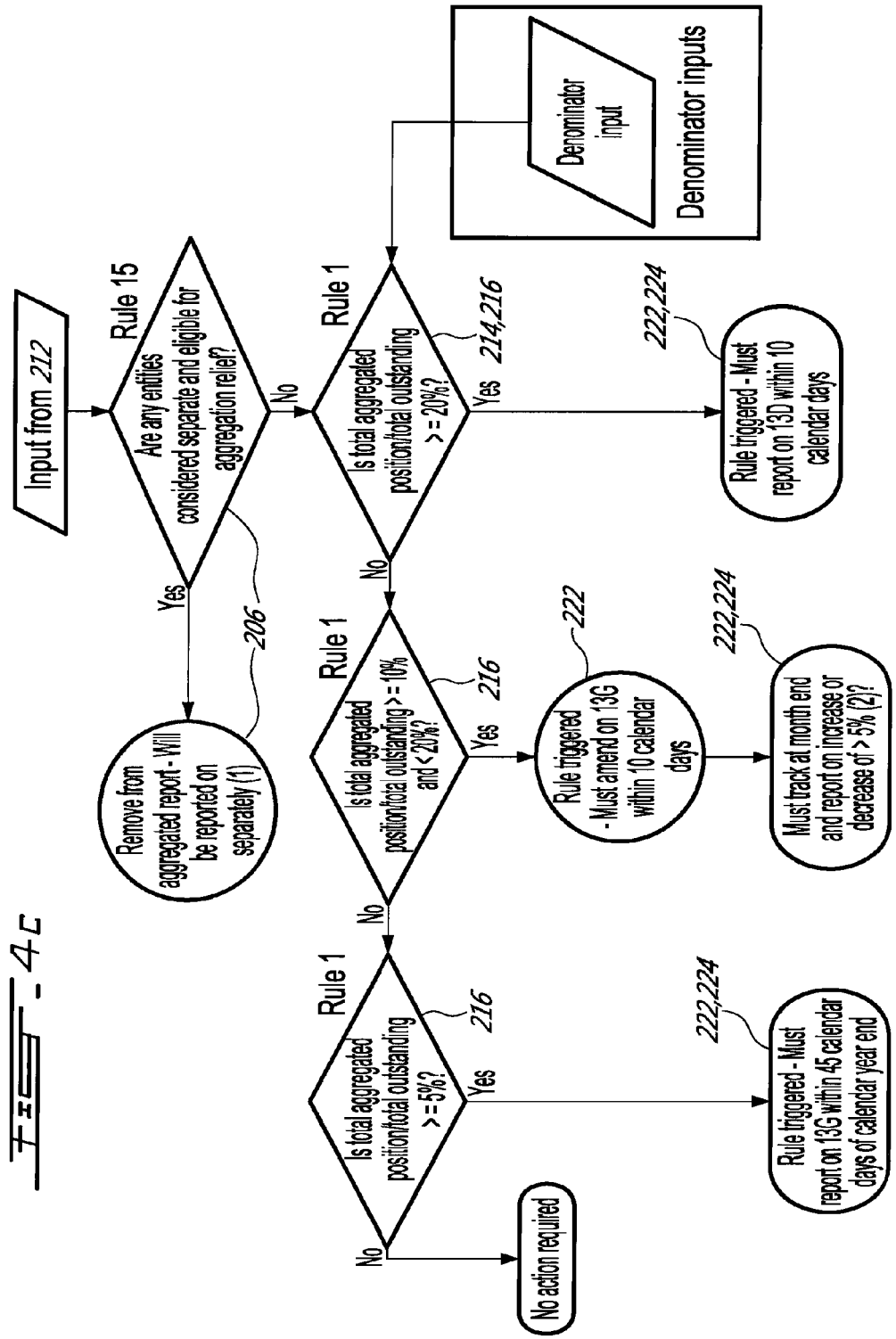
Figure 4D:
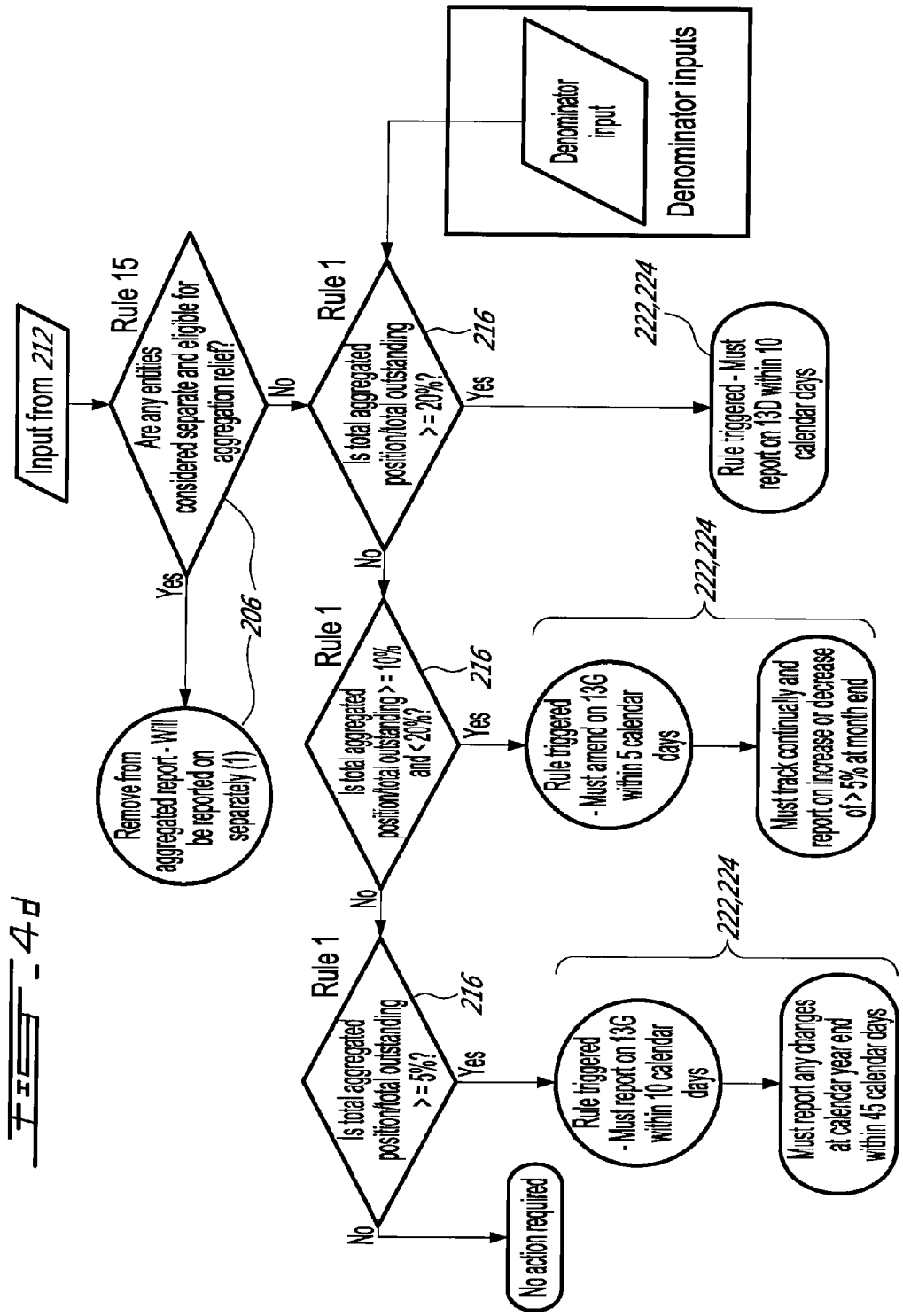
Figure 4E:
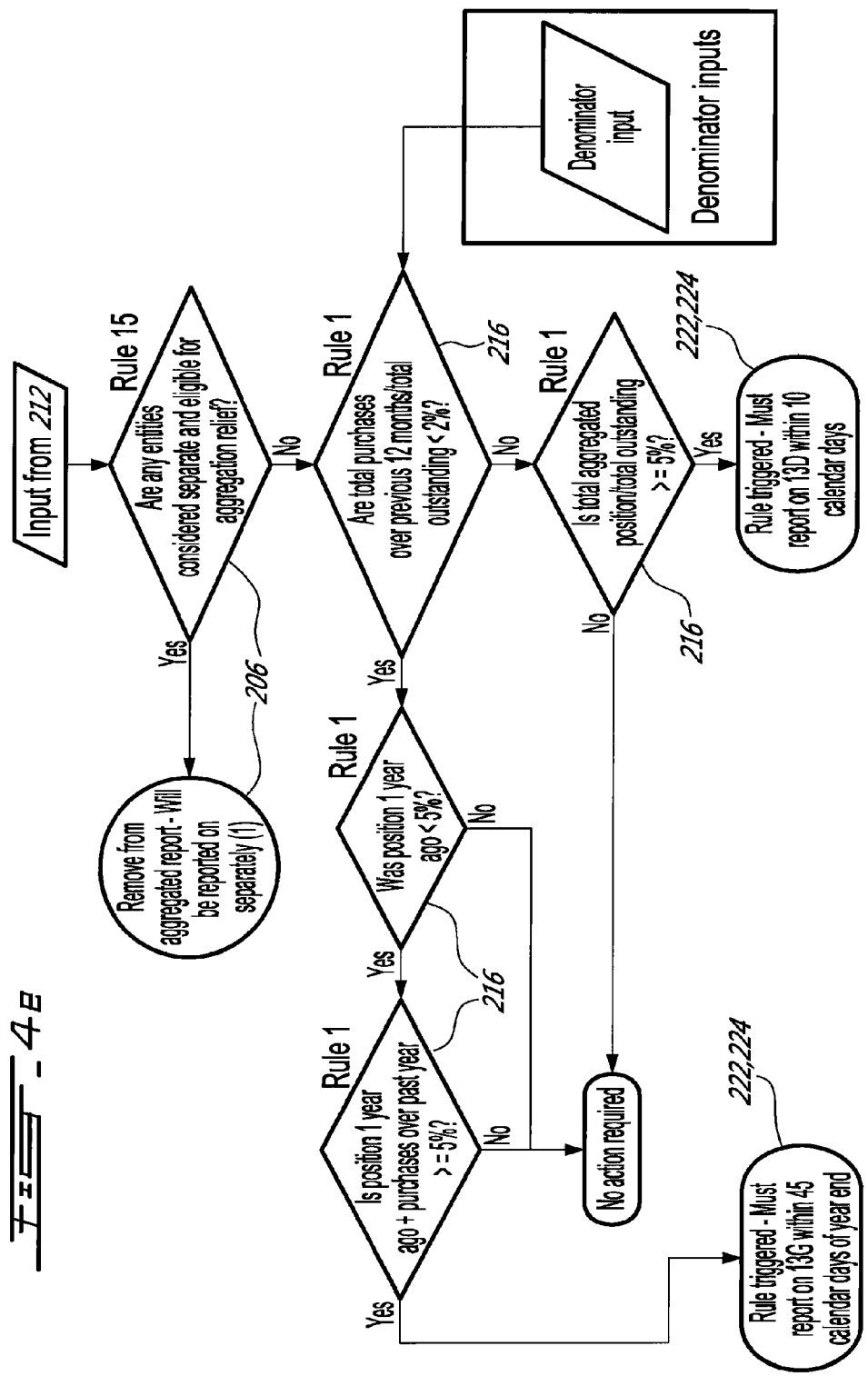
Figure 5A:
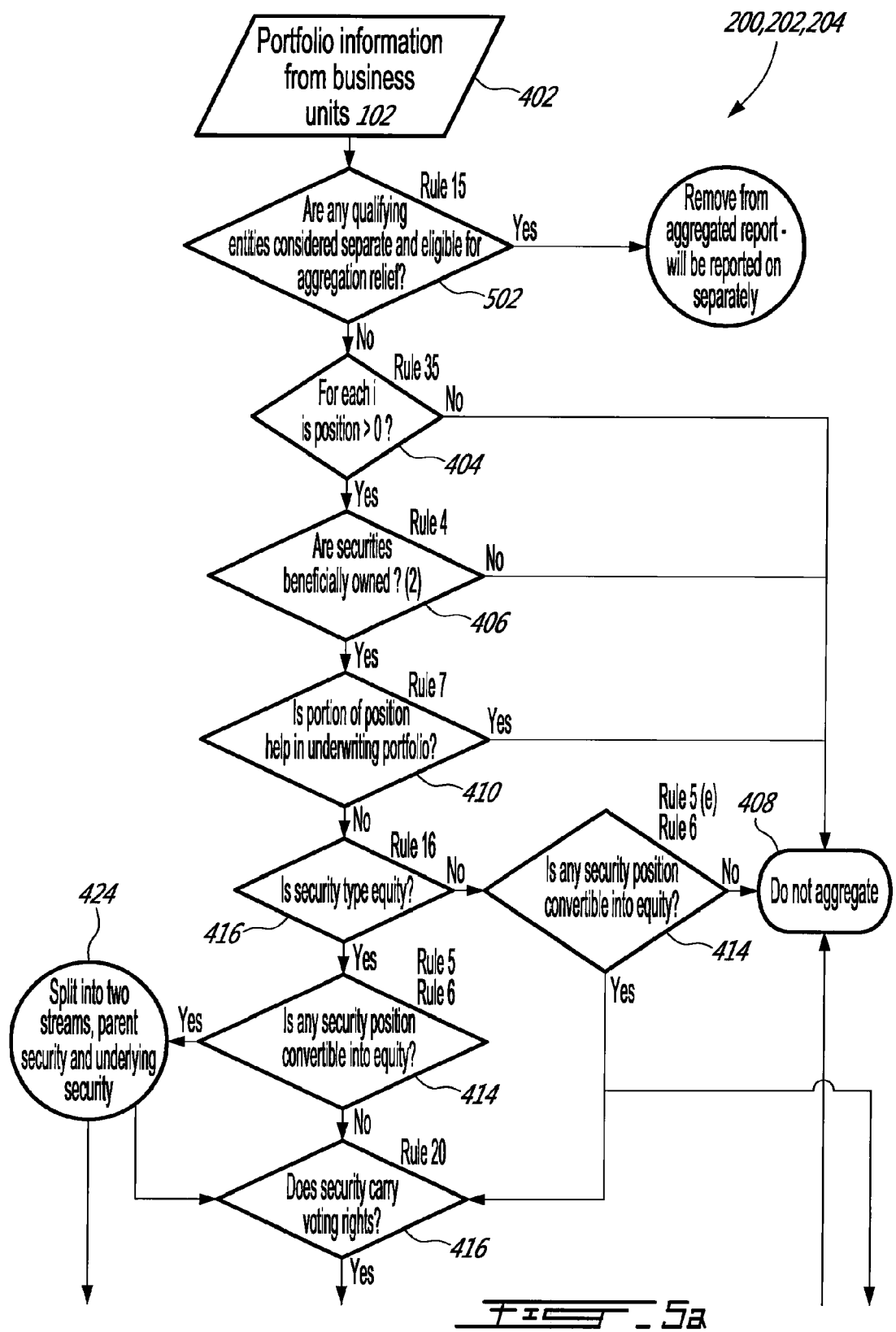
Figure 5A:
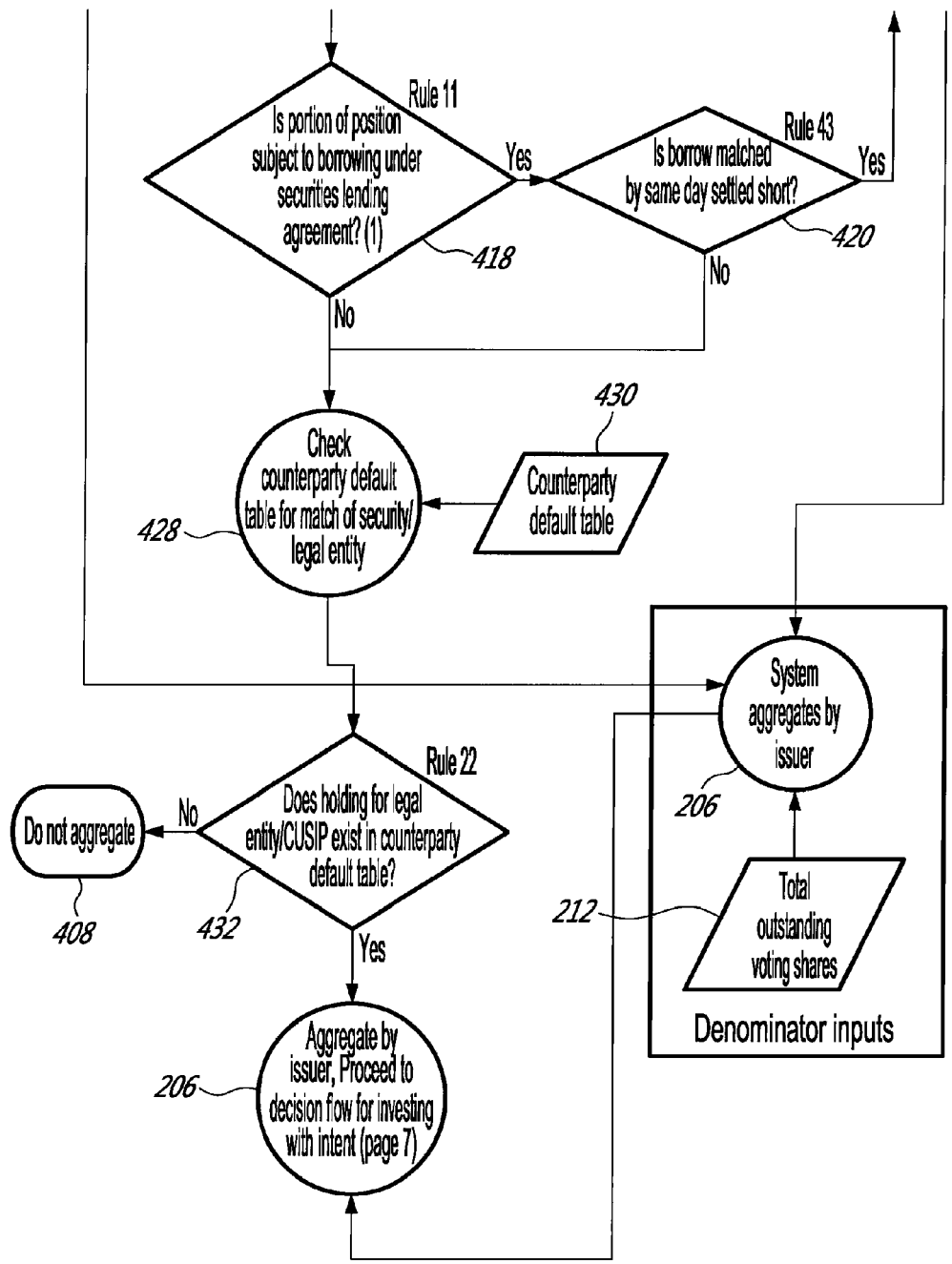

Examples of processes 200 suitable for use in monitoring and/or ensuring compliance with Section 13 of the US Securities Exchange Act are shown in FIG. 4 (including FIGS. 4A-4E) and FIG. 5. FIGS. 4A-4E show an embodiment of such processes for securities which are convertible within sixty (60) days of the determination being made. Processes 200 of FIGS. 4, 5, and 6 may be implemented, as will be understood by those skilled in the relevant arts, once they have been made familiar with this disclosure, using any suitable data processing techniques, many of which are currently known and others of which will doubtless hereafter be developed. For example, the accessing, reading, and parsing of data, and setting of suitable flags or other data values in records associable with appropriately-configured data recorda and data sets, can be used to make the various comparisons and determinations indicated, and data can be stored in appropriate forms and/or sets for further processing as indicated.

In FIGS. 4 and 5 references to "Rule 35," "Rule 4", "Rule 22," etc., are intended to correlate illustrated processes with corresponding SEC rules. However, as noted above, process steps shown in FIGS. 4A-4G, and elsewhere throughout the specification, are provided by way of data processing example only, and are not meant, or to be taken, as a recommendation or representation that such processes are consistent with compliance under Section 13 or any other law or regulation.

In FIG. 4A an embodiment of a batch process 200 for receiving and aggregating holdings data related to a plurality of securities i is shown, where appropriate pursuant to Section 13. At 402, each controlled entity 110 provides to a corresponding controlling entity system 102 data representing holdings for a plurality of securities i in a portfolio held by the respective controlled entity. Data may be provided using, for example, suitably-configured or adapted data record(s) 300, each comprising one or more data fields comprising flags or data useful for making the several determinations described.

At 404, for each security i a determination is made as to whether the entity has any holding, and at 406 it is determined, using for example suitably-adapted flags or fields in a corresponding data record 300, whether such holding(s) are beneficial for the controlled entity and/or controlling entity. Such determination, like those made at 406, 410, 412, 414, etc., may, for example, be made by comparing values of flags or other data items associated with data record(s) 300 corresponding to interests i held by the various reporting entities to 'true' and 'false' values previously determined and set in reference database(s) 104, etc., for such purpose(s). Many suitable data-parsing processes are known to those skilled in the relevant arts.

If the determination made at 404 is 'no,' the amount of such holdings by such entity(ies) is not aggregated, as shown at 408, by, for example, setting an appropriate flag associated with a data record associated with the corresponding interest to a value indicating 'do not aggregate,' or omitting to write a corresponding data record to an aggregation data set. Many suitable data-parsing processes are known to those skilled in the relevant arts.

If at 410 it is determined that any held, beneficially-owned security(ies) i are held merely in an underwriting portfolio, no aggregation is required and appropriate action is taken to omit such security(ies) from aggregation process 206.

At 412 the type of each beneficially-held security i that is not held merely as part of an underwriting portfolio is determined. If a security is not an equity, or is an equity, but carries no voting rights, no aggregation is required and appropriate action is taken to omit such security(ies) from aggregation process 206.

At 414, 424, 426, rules pertaining to convertible securities are applied pursuant to SEC Rules 5 and 6.

At 416, it is determined whether the interest i is a security carrying with it no voting rights. If no voting rights attach to the security, aggregation is not required.

If at 418 it is determined that a held security i has been borrowed from another entity in order to cover a short position, and at 420 that such security must be matched the same day in order to settle a short position, no aggregation is required and appropriate action is taken to omit such security(ies) from aggregation process 206.

At 428-440 the system 102, 106 determines whether any exempt counterparties are identifiable as beneficial holders of any of such securities, according to applicable regulations, e.g., SEC Rules 22, 37, 58, and 13d-1(b). Any corresponding securities may, in such case, be excluded from the aggregation process 206.

At 206, as previously discussed, aggregated amounts of holdings of respective securities or other interests i can be determined, for use in a denominator of a ratio used to determine relative total holdings.

FIGS. 4B-4E show different embodiments of processes 216, 222, 224, etc., in accordance with the specific regulatory example of FIG. 4A, pertaining to Section 13. Each such process can be implemented in accordance with the foregoing, and known or otherwise applicable data processing techniques.

FIG. 4B shows an example of a process 442 for applying holding company treatment rules in aggregating holdings, and determining whether further processing is required, to ensure compliance with Section 13, as for example provided in SEC Schedule 13G.

FIG. 4C shows an example of a process 444 for applying excluded entity rules in aggregating holdings, and determining whether further processing is required, to ensure compliance with Section 13, as for example provided in SEC Schedule 13D/G.

FIG. 4D shows an example of a process 446 for applying passive investor rules in aggregating holdings, and determining whether further processing is required, to ensure compliance with Section 13, as for example provided in SEC Schedule 13D/G.

FIG. 4E shows an example of a process 448 for applying non-excluded entity rules in aggregating holdings, and determining whether further processing is required, to ensure compliance with Section 13, as for example provided in SEC Schedule 13D/G.

FIG. 5 (including FIGS. 5A and 5B) illustrates an example of a process 200 configured for use in monitoring and/or ensuring compliance with Section 13 of the US Securities Exchange Act. FIG. 5 shows an embodiment of such processes for the case in which all processed interests are convertible to securities, as determined at 502 using appropriately configured flags or other suitable data processing techniques. Processing at the various steps or blocks 404, 406, etc., can proceed as described above.

Figure 6:
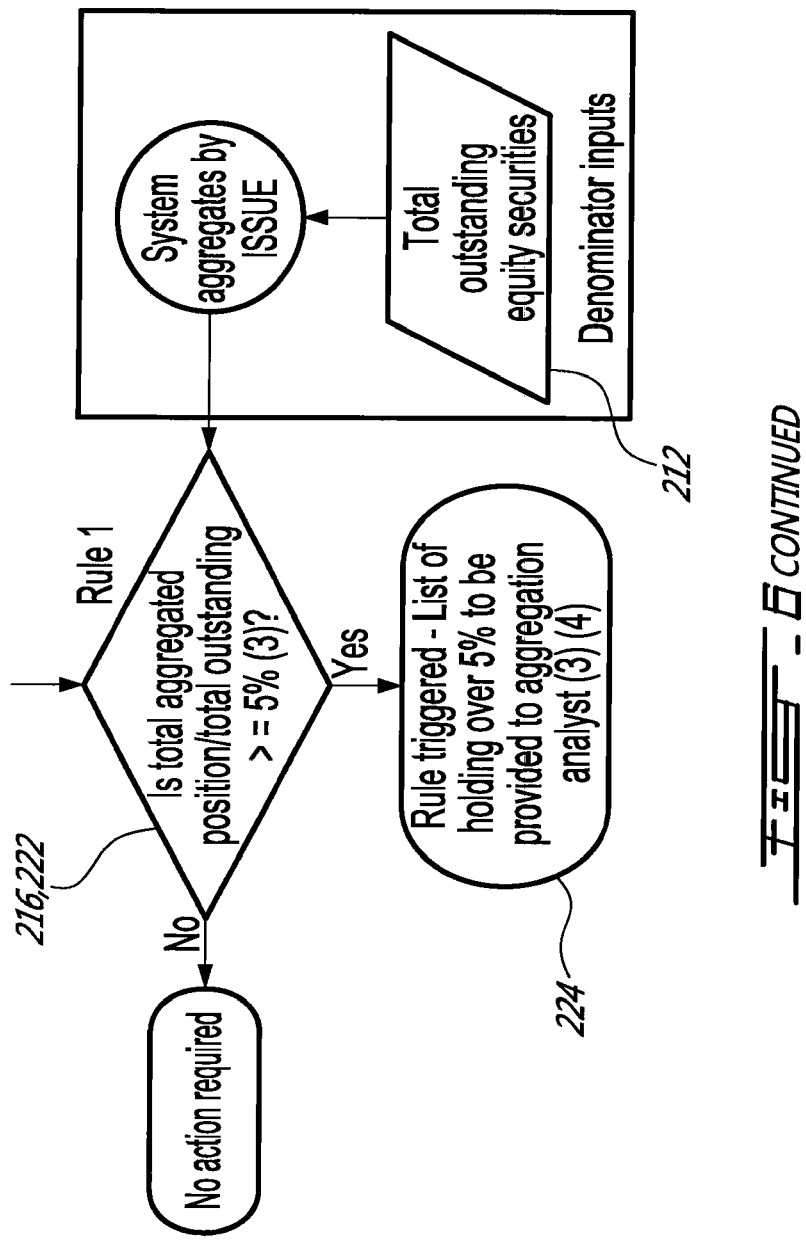

FIG. 6 illustrates an example of a process 200 configured for use in monitoring and/or ensuring compliance with a dividend stop-loss rule of the Ontario Securities Commission. In the embodiment shown, if at 602 it is determined, using for example suitably-adapted flags and/or fields in one or more corresponding data records 300, that any holdings are a result of borrowing under a securities lending agreement, or if such holdings are not beneficially owned by the controlling entity 110 from which corresponding holdings data was received, such holdings may be excluded from aggregation.

FIGS. 7-12 provide schematic illustrations of examples of interactive user interface screens suitable for use in initiating and otherwise controlling systems and processes according to the invention. Interface screens 700, 900, 1000, 1100, 1200, etc., can be rendered on suitably-configured output displays using, as will be understood by those skilled in the relevant arts, once they have been made familiar with this disclosure, any suitable input/output signal processing techniques, many of which are currently known and others of which will doubtless hereafter be developed. For example, Windows™ and other commercially-available operating systems provide protocols and standards suitable for implanting such interface screens. Input data collected using screens 700, 900, 1000, 1100, 1200, etc., can be used in starting and controlling any of the various processes 200, or portions thereof, described herein.

Figure 7:
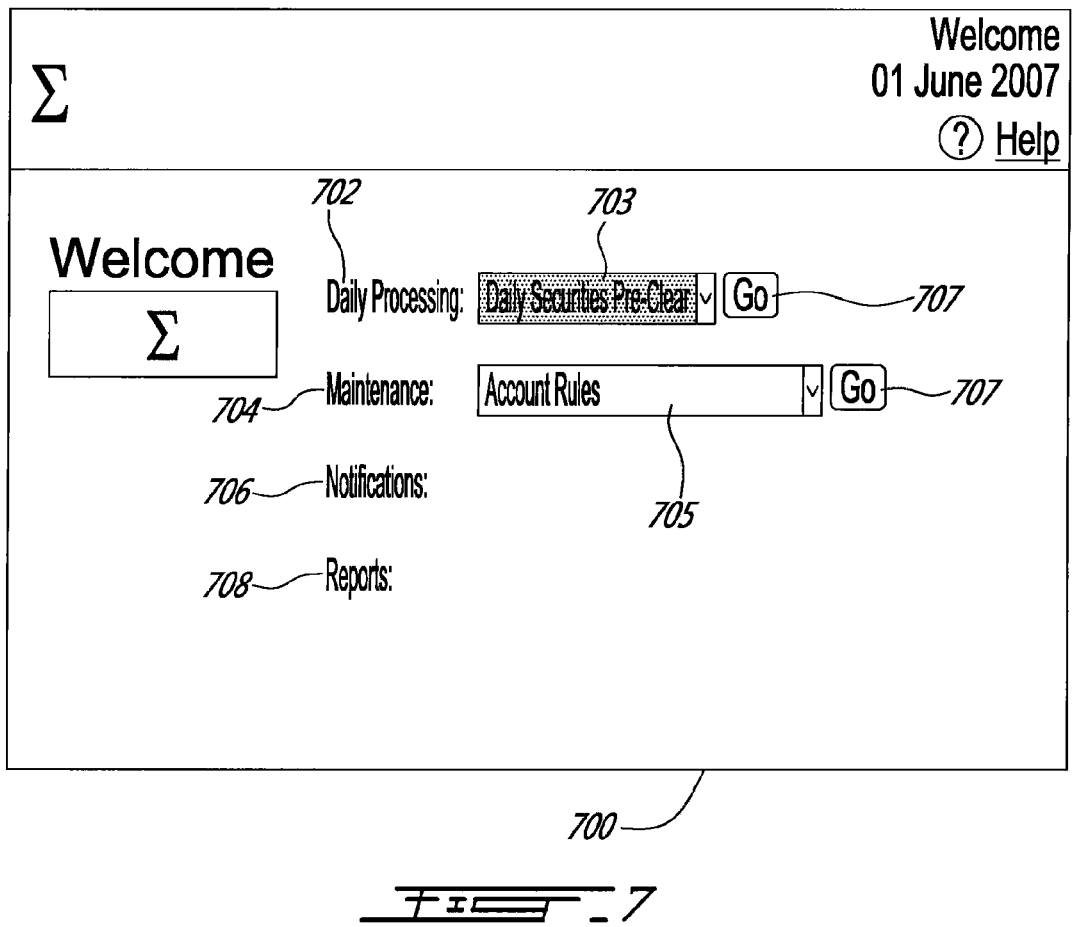

FIG. 7 shows an example of a user interface screen 700 suitable for use in initiating a process 200 as shown for example in any or all of FIGS. 2 and 4-6. Startup screen 700 (like screens 900, 1000, 1100, 1200, etc.) is suitable for presentation on, for example, a user display of a input/output system of a PC-class or other computer adapted for controlling any or all of systems 102, 106, 110, in response to appropriately-configured command inputs. In the embodiment shown, startup screen 700 provides a user with a choice of functions 702 "Daily Processing," 704 "Maintenance," 706 "Notification," and 708 "Reports," any/or all of which can be selected using, and/or associated with a number of execution options selectable using, for example known point-and-click techniques executable using input devices such as keyboards, mice, trackballs, etc. In the embodiment shown, for example, functions 702 "Daily Processing" and 704 "Maintenance" are associated with execution options accessible through use of drop-down menus 703, 705 respectively, and executable through selection of "Go" items 707.

FIG. 8A shows an example of a drop-down menu 703 associated with an execution option 702 "Daily Processing." In the embodiment shown, menu 703 comprises at least the following options, selection of which can cause the user's input system to generate execution commands adapted to cause presentation of one or more follow-on screens adapted for interactive collection and control of suitable input and execution options:

Daily Securities Pre-Clear (714): allows the user to determine, in advance, whether proposed trades in one or more specified interests will cause either the controlling entity or one or more controlled entities to exceed any predefined alert or reporting thresholds.

Position: allows a user to search for any security position by security name and informs on all entity holdings.

Position exclusion: allows a user to specify any specified interest(s) and/or any specified controlled or controlling entities to be excluded from any subsequent query processes 200.

Regulation exclusion: allows a user to specify any specified regulation(s) (including for example sub-parts of regulations) to be excluded from any subsequent query processes 200.

SEC13F Filing Data: generates a report concerning currently-applicable for use in generating a report under US SEC Section 13F (or any other specified regulation) for all positions within designated portfolio(s).

SEC13F Filing Data: generates a log of previously-generated reports under US SEC Section 13F (or any other specified regulation) with respect to any specified portfolio(s).

SEC13F Interim Filing Data: provides the generated US SEC Section 13F aggregation result at the sub-entities level allowing for data to be returned to entities 110, etc., for attestation and verification of accuracy, returned data then can be re-aggregated into a 'consolidated report' at the entity level.

Security Description: provides a search and retrieval functionality that provides, on demand, all security- (or interest-) specific information held within the system 100 (e.g., in database(s) 103, 104, and or available through any of services 130) for use in analysis and modification, as required, with full audit trail functionality.

Security Issuers: provides a search and retrieval functionality that provides, on demand, all issuer-specific information held within the system 100 (e.g., in database(s) 103, 104, and or available through any of services 130) for use in analysis and modification, as required, with full audit trail functionality.

Temporary Position: Allows users to access to post-aggregation data sets for inspection.

Job Processing: Allows for manual execution of all regulatory- and aggregation-related processes; can for example be used when data has been corrected intra-day and new results required same day.

FIG. 8B shows an example of a drop-down menu 705 associated with an execution option 704 "Maintenance." In the embodiment shown, menu 705 comprises a number of options, selection of which can cause the user's input system to generate execution commands adapted to cause presentation of one or more follow-on screens adapted for interactive collection of suitable input and execution options, in order to provide output identifying or otherwise related to account rules, business units, parties identified as counterparts to specified actions or classes of actions, etc.

FIG. 9 shows an example of a user interface screen 900 generated by a system(s) 102, 106 and displayed on a user input/output display screen in response to a user's selection of 706 "Notifications" in for example screen 700. In the embodiment shown, screen 900 is configured to facilitate interactive collection of suitable input and execution options for completing the following processing tasks, using for example known point-and-click input techniques, couple with the use of drop-down menus and keyboard input:

Notification Type (902): allows the user to select, by security or issuer, the type of interests for which notification(s) are desired. A drop-down menu can provide choices of equity, debt, or other interests, as desired.

Regulation Code (906): allows the user to designate which set of regulatory or other rules or schemes to use in generating notifications. Selection of a regulation (e.g., the Ontario Stop-Loss Rule, as shown) or set of regulations can cause processor(s) 102, 106 to access corresponding data in, for example, one or more data stores 104 and use it in generating notifications using one or more processes 200.

Security Identifier Type (908): allows the user to designate the type(s) of identifiers used to search database(s) or source(s) 103, 104, 130 etc., of securities holdings (i.e., position) reports. For example, CUSIP, ISIN, SEDOL, etc.

Issuer Identifier Type (910): allows a user to designate a type of issuer identifier to be used in searching a database of securities holdings (i.e., position) reports.

From/To Date(s) (912): allows a user to specify a date range to be used in searching a database for relevant holdings or position reports.

Breach Type (914): allows a user to designate either searches for breaches or early warnings.

Security Identifier (916): allows the user to designate one or more specific securities (or other interests) to be the subject of the generated notification(s), using the identifier type designated in the left column.

Issuer Identifier (918): allows the user to designate one or more specific issuers to be used in generating the requested notification(s), using the identifier type designated in the left column.

Selection of "Search" item 904 can cause notifications to be generated using criteria designated in one or more of the displayed input boxes and a process 200 such as that shown in any of FIGS. 2 and 4-6, as described herein. Selection of "Extract" item 942 allows a user to export output to a file or other data structure useful for persistent storage according to a desired format or protocol, including for example Excel™ spreadsheet or comma-separated value (CSV) format for reporting or further analysis purposes.

FIG. 10 shows an example of a "Notification" output screen 1000 generated by system(s) 102, 106 and displayed on a user input/output display screen in response to a user's selection of execution item 904 "Search" in for example screen 900. In the embodiment shown, screen 1000 displays confirmation of all inputs entered by the requesting user using interactive screen 900. As a result of execution of a process 200 as described herein, screen 1000 also provides, at 1002, a report of the determined total of outstanding shares (held by all parties, controlled, controlling, and third parties) in relevant markets according to the regulatory scheme designated using screen 900; at 1004, the total number of shares, or value, or amount, of the designated interest held by all relevant controlled and controlling entities, according to the designated regulatory scheme; at 1006 the percentage of outstanding shares owned (or otherwise beneficially controlled, as defined by the designated regulatory scheme) by all relevant controlled and controlling entities pursuant to the designated regulatory scheme; and at 1008 the threshold level ("trigger percentage") of the selected type, under the designated regulatory scheme (as designated, for example, using "Breach Type" 914 in FIG. 9).

FIG. 11A shows an example of a user interface screen 1100 generated by a system(s) 102, 106 and displayed on a user input/output display screen in response to a user's selection of 714 "Daily Securities Preclear" in for example screen 700. In the embodiment shown, screen 1100 is configured to facilitate interactive collection of suitable input and execution options for generating a pre-clearance report of a proposed transaction involving a specific security, or other interest. Input collected by use of a screen 1100 can include, for example, terms of a proposed transaction, including for example identifier(s) of interests to be transacted, and amounts thereof to be acquired or relinquished. To do so, screen 1100 is configured to elicit input by a requesting user of the following data, to be used in a subsequent process 200:

Security Identifier Type (908): allows the user to designate the type(s) of identifiers used to identify interests of the type for which a transaction is proposed, and is to be pre-cleared.

Security Identifier (916): allows the user to designate one or more specific securities (or other interests) to be the subject of the pre-clearance report.

Stock Exchange (1102): allows the user to designate a particular exchange (or exchanges) on which the specified interest(s) are to be acquired or disposed of.

Ownership (or control) Category (1104): allows the user to specify the type of ownership or control to be exercised by the acquiring entity(ies) of the acquired or relinquished interests.

Expiry Date (1106): allows the user to specify the date on which the proposed transaction is to take place, so that, for example, known intermediate developments (e.g., the expiration of unexercised options, etc) can be accounted for under relevant regulatory schemes).

Input Shares Quantity (1108): allows the user to specify a number of shares, or value, or other amount, of the specified interest(s) to be acquired or relinquished.

Comment (1112): allows the user to enter any observations, questions, or instructions to a subsequent human or automated reviewer. For example, in systems in which pre-cleared trades are to be reviewed and optionally approved by human administrators, relevant comments may be shared here.

FIG. 11B shows an example of a preclearance report presented on an output screen 1200 generated by a system(s) 102, 106 and displayed on a user input/output display screen in response to a user's selection of execution item 1110 "Submit" in for example screen 1100, and optionally to any further approval by, for example, an administrator using a system 106. In the embodiment shown, screen 1200 displays confirmation of all inputs entered by the requesting user using interactive screen 1100. As a result of execution of a process 200 as described herein, screen 1200 also provides, at 1202, a report of the total quantity or amount of the specified interest(s) currently held by the controlled and/or controlling entity (ies); at 1204, the total relative amount of shares, or value, or amount, of the designated interest(s) held by all relevant controlled and/or controlling entities; at 1206 the total shares or amount of such interest(s) that would be held by all relevant controlled or controlling entities after the proposed transaction, as of the date specified at 1106; and at 1208 the relative proportion of the total market of such interests that would be so held at that time.

Optionally screen 1200 can further provide warnings of any reports or alerts that would be required and/or generated as a result of fulfillment of the proposed transaction(s).

Thus it may be seen that, systems, methods, and programming structures according to the invention can be configured for periodically, or on demand, receiving from each of the plurality of commonly-controlled entity (sub)systems 110 the signals representing one or more reports of holdings of pluralities of securities held by the respective entity, and for providing to an administrator system 106 signals suitable for causing the administrator system to provide an alert indicating that the relative level of holdings of at least one of the securities held by the plurality of commonly-controlled entities has exceeded a pre-defined threshold. Such systems, methods, and instructions can further be configured for generating alerts to be output by or thorough administrator system(s) 106 and/or for generating and/or transmitting data representing a regulatory compliance report to a communications resource 120 representing or otherwise controlled by a regulatory compliance address.

While the invention has been described and illustrated in connection with specific, presently-preferred embodiments, many variations and modifications may be made without departing from the spirit and scope of the invention. The invention is therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the claims is to be defined solely by the appended claims, giving due consideration to the doctrine of equivalents and related doctrines.

What is claimed is:

1. A system for aggregating data representing holdings of securities held by a plurality of commonly-controlled entities, comprising at least one data processor configured for:

receiving from each of a plurality of commonly-controlled-entity systems signals representing one or more reports of holdings of pluralities of securities held by corresponding commonly-controlled entities;

accessing in machine-readable storage associated with the at least one data processor data representing requirements imposed by one or more regulatory agencies;

generating data records representing collated and aggregated totals of securities held by the plurality of commonly-controlled entities;

using the data representing requirements imposed by one or more regulatory agencies, determining a level of holdings for at least one security held by the plurality of commonly-controlled entities; and storing data representing the determined level of holdings for the at least one security in machine-readable memory.

2. The system of claim 1, wherein the at least one data processor is configured for periodically receiving from each of the plurality of commonly-controlled-entity systems the signals representing one or more reports of holdings of pluralities of securities held by corresponding commonly-controlled entities.

3. The system of claim 1, wherein the at least one data processor is configured for providing to an administrator signals suitable for causing the administrator system to generate signals representing an alert indicating that a determined level of holdings of at least one of the securities held by at least one of the plurality of commonly-controlled entities has exceeded a pre-defined threshold.

4. The system of claim 3, wherein the pre-defined threshold corresponds to an early warning level.

5. The system of claim 3, wherein the pre-defined threshold corresponds to a regulatorily-imposed level.

6. The system of claim 3, wherein the data processor is configured to generate data useful for generating a regulatory compliance report when the determined level of holdings of at least one of the securities held by the plurality of commonly-controlled entities has exceeded a pre-defined threshold.

7. The system of claim 3, wherein the data processor is configured to transmit signals representing a regulatory compliance report to a communications resource associated with a regulatory compliance address.

8. The system of claim 1, wherein the requirements imposed by one or more regulatory agencies are imposed by a plurality of regulatory agencies.

9. The system of claim 1, wherein the determined level of holdings for at least one security held by the plurality of commonly-controlled entities is a relative level.

10. A method, performed by at least one data processor executing machine-interpretable instructions, of generating signals representing levels of securities held by a plurality of commonly-controlled entities, comprising:

receiving from each of a plurality of commonly-controlled-entity systems signals representing one or more reports of holdings of pluralities of securities held by corresponding commonly-controlled entities;

accessing in machine-readable storage associated with the at least one data processor data representing requirements imposed by one or more regulatory agencies;

generating data records representing collated and aggregated totals of securities held by the plurality of commonly-controlled entities;

using the accessed data, determining a level of holdings for one or more of the securities held by the plurality of commonly-controlled entities; and storing data representing the determined levels in machine-readable memory.

11. The method of claim 10, comprising periodically receiving from each of the plurality of commonly-controlled-entity systems signals representing one or more reports of holdings of pluralities of securities held by the corresponding commonly-controlled entities.

12. The method of claim 10, comprising providing to an administrator system signals suitable for causing the administrator system to generate signals representing an alert indicating that the relative level of holdings of at least one of the securities held by at least one of the plurality of commonly-controlled entities has exceeded a pre-defined threshold.

13. The method of claim 12, wherein the pre-defined threshold corresponds to an early warning level.

14. The method of claim 12, wherein the pre-defined threshold corresponds to a regulatorily-imposed level.

15. The method of claim 12, comprising generating data useful for preparing a regulatory compliance report when the relative level of holdings of at least one of the securities held by the plurality of commonly-controlled entities has exceeded a pre-defined threshold.

16. The method of claim 12, comprising transmitting signals representing a regulatory compliance report to a communications resource associated with a regulatory compliance address.

17. The method of claim 10, wherein accessing data representing requirements imposed by one or more regulatory agencies comprises accessing data representing requirements imposed by a plurality of regulatory agencies.

18. The method of claim 10, wherein determining a level of holdings for one or more of the securities held by the plurality of commonly-controlled entities comprises determining a relative level of the securities held by the plurality of entities.

19. A system for assessing regulatory consequences of a proposed transaction in securities by one or more of a plurality of commonly-controlled entities, the system comprising at least one data processor configured for:

receiving from a commonly-controlled entity system signals representing terms of a proposed transaction in one or more securities;

receiving from each of a plurality of commonly-controlled-entity systems signals representing one or more reports of holdings of pluralities of securities held by corresponding commonly-controlled entities;

accessing in machine-readable storage associated with the at least one data processor data representing requirements imposed by one or more regulatory agencies relevant to at least one jurisdiction associated with the proposed transaction;

generating data records representing collated and aggregated totals of securities held by the plurality of commonly-controlled entities;

using the data representing requirements imposed by one or more regulatory agencies, determining a level of holdings for at least one security held by the plurality of commonly-controlled entities;

generating signals representing the determined level of holdings for the at least one security; and storing data representing the determined level of holdings for the at least one security in machine-readable memory.

20. A method, performed by at least one data processor executing machine-interpretable instructions, of assessing regulatory consequences of a proposed transaction in securities by one or more of a plurality of commonly-controlled entities, the method comprising:

receiving from a commonly-controlled entity system signals representing terms of a proposed transaction in one or more securities;

receiving from each of a plurality of commonly-controlled-entity systems signals representing one or more reports of holdings of pluralities of securities held by corresponding commonly-controlled entities;

accessing in machine-readable storage associated with the at least one data processor data representing requirements imposed by one or more regulatory agencies relevant to at least one jurisdiction associated with the proposed transaction;

generating data records representing collated and aggregated totals of securities held by the plurality of commonly-controlled entities;

using the data representing requirements imposed by one or more regulatory agencies, determining a level of holdings for at least one security held by the plurality of commonly-controlled entities;

generating signals representing the determined level of holdings for the at least one security; and storing data representing the determined level of holdings for the at least one security in machine-readable memory.

* * * * *